US010084978B2

United States Patent
Hiasa et al.

(10) Patent No.: US 10,084,978 B2
(45) Date of Patent: Sep. 25, 2018

(54) IMAGE CAPTURING APPARATUS AND IMAGE PROCESSING APPARATUS

(71) Applicant: CANON KABUSHIKI KAISHA, Tokyo (JP)

(72) Inventors: Norihito Hiasa, Utsunomiya (JP); Hironobu Koga, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/054,809

(22) Filed: Feb. 26, 2016

(65) Prior Publication Data
US 2016/0255294 A1 Sep. 1, 2016

(30) Foreign Application Priority Data

Feb. 27, 2015 (JP) .................................. 2015-038668

(51) Int. Cl.
H04N 5/369 (2011.01)
H04N 5/225 (2006.01)
H04N 5/232 (2006.01)

(52) U.S. Cl.
CPC ......... *H04N 5/3696* (2013.01); *H04N 5/2254* (2013.01); *H04N 5/23235* (2013.01)

(58) Field of Classification Search
CPC ..................... H04N 5/3696; H04N 5/2254
See application file for complete search history.

(56) References Cited

U.S. PATENT DOCUMENTS 5,729,011 A * 3/1998 Sekiguchi ................. G01J 3/14
250/208.1
7,962,033 B2 6/2011 Georgiev et al.
(Continued)

FOREIGN PATENT DOCUMENTS

JP 2008515110 A 5/2008
JP 2008299184 A 12/2008
(Continued)

OTHER PUBLICATIONS

Bioucas-Dias et al., "A New TwIST: Two-Step Iterative Shrinkage/Thresholding Algorithms for Image Restoration", IEEE Transactions on Image Processing, vol. 16, pp. 1-13, Dec. 2007. Abstract also provided.

(Continued)

*Primary Examiner* — Jason A Flohre
(74) *Attorney, Agent, or Firm* — Rossi, Kimms & McDowell LLP

(57) ABSTRACT

The image capturing apparatus includes an image sensor including multiple pixels each including at least one photoelectric convertor and a transmittance distribution provider to provide, to at least part of the multiple pixels, a transmittance distribution depending on an incident angle of light. The multiple pixels includes an adjacent pixel group that includes a first pixel and second pixels adjacent to the first pixel, the adjacent pixel group including pixels to which mutually different four or more kinds of the transmittance distributions are provided. The apparatus produces, by using an input image produced from an output of the image sensor and information on the transmittance distributions, an output image corresponding to an optical observation image observable when an object space is observed from a partial area of a pupil of an imaging optical system.

15 Claims, 13 Drawing Sheets

(56) References Cited

U.S. PATENT DOCUMENTS

| | | | |
|---|---|---|---|
| 8,953,064 B1 | 2/2015 | Ng et al. | |
| 2009/0027542 A1* | 1/2009 | Yamamoto | H04N 5/2254 |
| | | | 348/340 |
| 2010/0045844 A1* | 2/2010 | Yamamoto | H04N 5/2254 |
| | | | 348/340 |
| 2012/0140100 A1* | 6/2012 | Shibazaki | H01L 27/14621 |
| | | | 348/281 |
| 2012/0162457 A1* | 6/2012 | Veeraraghavan | H04N 5/2254 |
| | | | 348/222.1 |
| 2013/0162861 A1* | 6/2013 | Yamamoto | H04N 5/2254 |
| | | | 348/222.1 |
| 2014/0253781 A1* | 9/2014 | Gill | H04N 5/2254 |
| | | | 348/335 |
| 2014/0333732 A1* | 11/2014 | Hamashima | H04N 13/0217 |
| | | | 348/49 |
| 2015/0201143 A1* | 7/2015 | Ono | H04N 5/2254 |
| | | | 348/302 |

FOREIGN PATENT DOCUMENTS

| | | |
|---|---|---|
| JP | 2014060693 A | 4/2014 |
| JP | 2014060694 A | 4/2014 |
| WO | 2006039486 A2 | 4/2006 |

OTHER PUBLICATIONS

Baraniuk, "Compressive Sensing", IEEE Signal Processing Magazine, pp. 118-120 and p. 124, Jul. 2007.

* cited by examiner

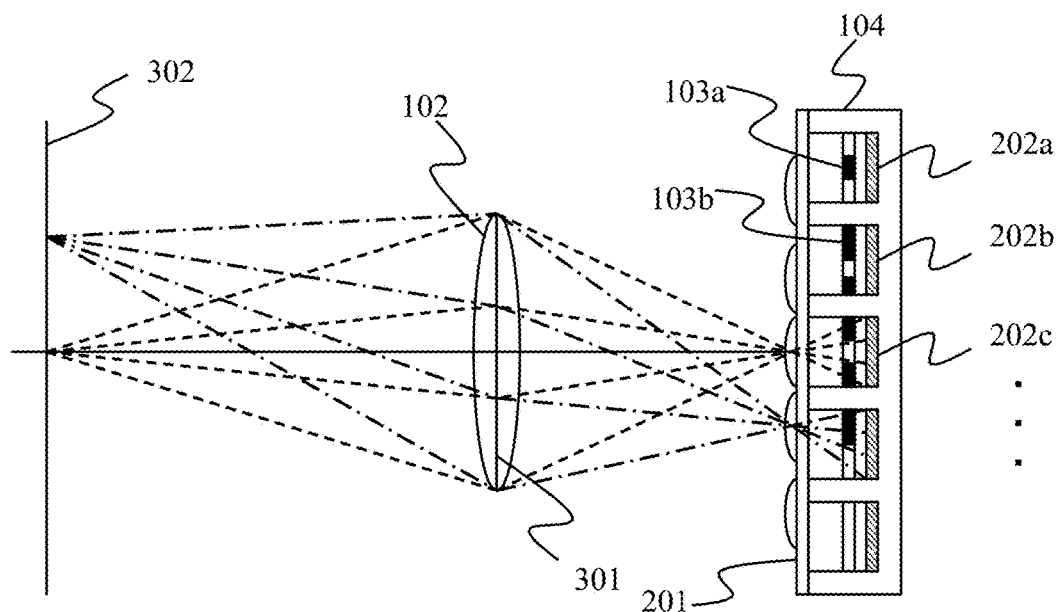
FIG. 1
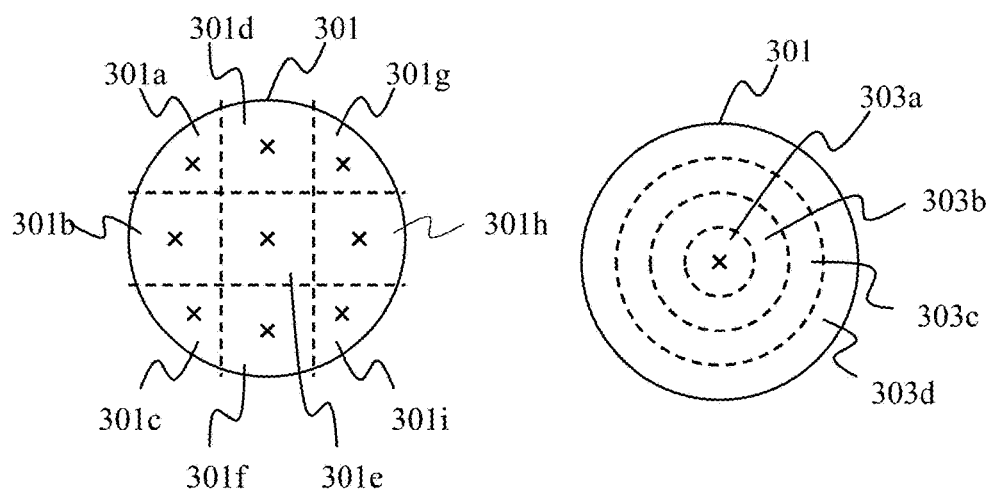
FIG. 2A
FIG. 2B

IMAGE CAPTURING APPARATUS AND IMAGE PROCESSING APPARATUS

BACKGROUND OF THE INVENTION

Field of the Invention

The present invention relates to an image capturing apparatus suitable for producing, by image processing, multiple images corresponding to observable optical images observable when an object space is observed from mutually different pupil areas.

Description of the Related Art

Various image capturing apparatuses are proposed each of which simultaneously performs image capturing of an object space through mutually different pupils to acquire multiple images respectively corresponding to the pupils.

A pupil when image capturing is performed is a factor on which a depth of field and a viewpoint of an captured image depend, and therefore performing image capturing of an object space through mutually different pupils to acquire multiple captured images enables realizing various functions. For example, multiple captured images whose viewpoints (depending on the pupils) are mutually different provide parallax information, which makes it possible to provide three-dimensional information of the object space. Furthermore, performing a reconstruction process on multiple captured images whose viewpoints are mutually different enables refocus, which is a focus control after image capturing for acquiring these captured images, and a viewpoint change.

PCT International Application Publication No. WO2006/039486 and U.S. Pat. No. 7,962,033 disclose cameras including a lens array disposed between a main lens and an image sensor and constituted by multiple minute lenses whose arrangement pitch is larger than a pixel pitch of the image sensor; each camera acquires multiple viewpoint images (so-called a light field).

However, acquiring such multiple viewpoint images by one camera as disclosed in PCT International Application Publication No. WO2006/039486 and U.S. Pat. No. 7,962,033 requires an image sensor having an extremely large number of pixels. This is because the number of pixels required for information acquisition depends on a product of a resolution of each viewpoint image and the number of pupils (the number viewpoints). Such an image sensor having an extremely large number of pixels causes an increase in cost of the image sensor and an increase in image data volume transmitted from the image sensor or stored.

Even if the image sensor has a small number of pixels, multiple viewpoint images having a high resolution can be acquired by performing pixel-shifting super-resolution using multiple images acquired through image capturing with scanning of the object space or through continuous image capturing with minute shifting of the image sensor.

However, these image capturing method acquire temporally shifted images and thereby cannot provide correct information when performing image capturing of an object space including a moving object.

SUMMARY OF THE INVENTION

The present invention provides an image capturing apparatus and an image processing apparatus each capable of producing multiple high resolution images corresponding to optical images observable when an object space is observed from mutually different pupils.

The present invention provides as an aspect thereof an image capturing apparatus including an image sensor configured to capture an optical image formed by light entering an imaging optical system from an object space. The image sensor includes multiple pixels each including at least one photoelectric convertor and a transmittance distribution provider configured to provide, to at least part of the multiple pixels, a transmittance distribution depending on an incident angle of the light. The multiple pixels includes an adjacent pixel group that includes a first pixel and second pixels adjacent to the first pixel, the adjacent pixel group including pixels to which mutually different four or more kinds of the transmittance distributions are provided. The apparatus further includes an image processor configured to produce, by using an input image produced from an output of the image sensor and information on the transmittance distributions, an output image corresponding to an optical observation image observable when the object space is observed from a partial area of a pupil of the imaging optical system.

The present invention provides as another aspect thereof an image processing apparatus including an image acquirer configured to acquire an input image produced by using an output from an image sensor configured to capture an optical image formed by light entering an imaging optical system from an object space. The image sensor includes multiple pixels each including at least one photoelectric convertor and a transmittance distribution provider configured to provide, to at least part of the multiple pixels, a transmittance distribution depending on an incident angle of the light. The multiple pixels includes an adjacent pixel group that includes a first pixel and second pixels adjacent to the first pixel, the adjacent pixel group including pixels to which mutually different four or more kinds of the transmittance distributions are provided. The apparatus further includes a producer configured to acquire information on the transmittance distributions of the multiple pixels, and produce, by using an input image produced from an output of the image sensor and information on the transmittance distributions, an output image corresponding to an optical observation image observable when the object space is observed from a partial area of a pupil of the imaging optical system.

Further features and aspects of the present invention will become apparent from the following description of exemplary embodiments with reference to the attached drawings.

BRIEF DESCRIPTION OF THE DRAWINGS

FIG. 1 illustrates a configuration of an image acquirer including an image sensor in an image capturing apparatus that is Embodiment 1 of the present invention.

FIG. 2A illustrates partial pupils in Embodiment 1.

FIG. 2B illustrates a collective pupil in Embodiment 1.

DESCRIPTION OF THE EMBODIMENTS

Figure 3A:
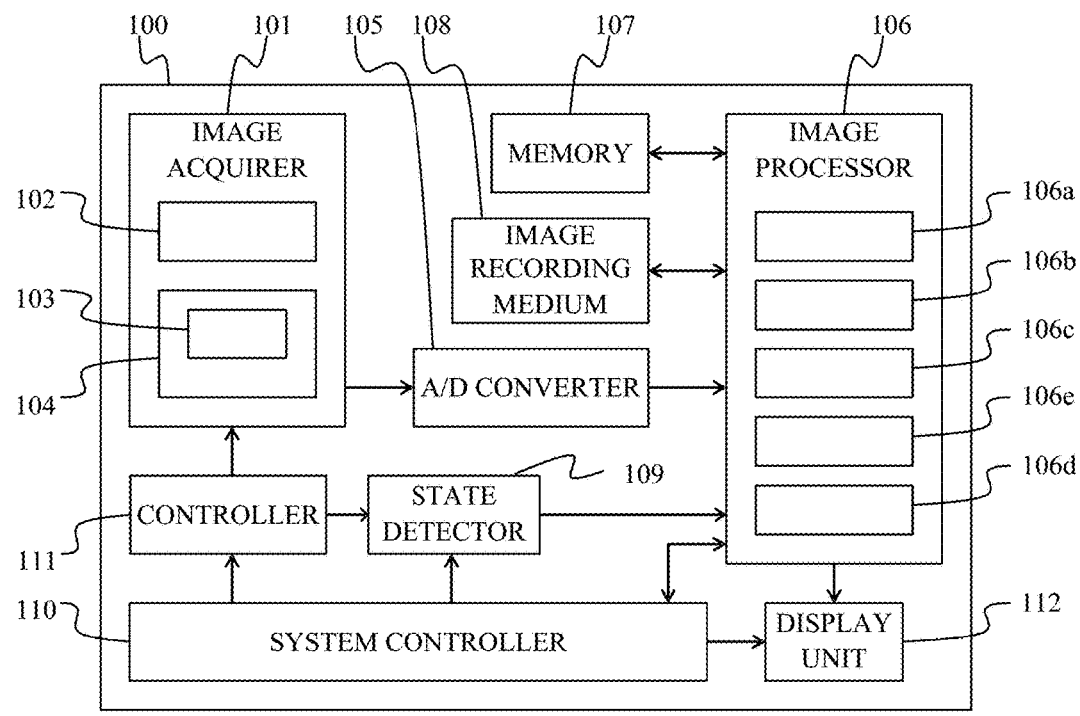
FIG. 3A is a block diagram illustrating a configuration of the image capturing apparatus of Embodiment 1.

Exemplary embodiments of the present invention will hereinafter be described with reference to the accompanying drawings.

Prior to description of specific embodiments, common matters to each embodiment will be described.

The above-described conventional camera configuration disclosed in PCT International Application Publication No. WO2006/039486 and U.S. Pat. No. 7,962,033 requires the image sensor whose number of pixels depends on the product of the resolution of each viewpoint image and the number of pupils (viewpoints).

On the other hand, each embodiment performs image capturing of mutually overlapped observable optical images respectively observable through mutually different pupils and then performs an image process to estimate multiple images respectively corresponding to the mutually overlapped observable object images and separate the estimated images from one another. Each embodiment is thereby free from the conventional requirement to the number of pixels included in the image sensor.

Each embodiment separates the captured images captured through the mutually different pupils by the image process performed after the image capturing and therefore uses an image sensor configured to provide mutually different transmittance distributions to the respective observable optical images observable through the mutually different pupils. Estimating the captured images captured through the mutually different pupils and mutually overlapped at the image capturing enables separating them from one another after the image capturing.

Next, description will be made of a relation between the pupil through which the object space is observed and the viewpoints.

In FIG. 2A, reference numerals 301a to 301i denote multiple mutually different pupil areas (partial areas; hereinafter referred to as "partial pupils") through which the object space is observed, and 301 a collective pupil in which the partial pupils 301a to 301i are collected.

Each embodiment performs, by using the image sensor, image capturing of multiple observable optical images that are respectively observable from the multiple partial pupils 301a to 301i (each observable optical image observable from the corresponding partial pupil is hereinafter referred to as "an observation image corresponding to a partial pupil") and that overlap one another. The number and shape of the partial pupils in FIG. 2A is merely an example, and the partial pupils may have other numbers and shapes.

In the camera (Plenoptic camera) disclosed in PCT International Application Publication No. WO2006/039486, a pupil of the main lens corresponds to the collective pupil, and multiple pixels corresponding to one minute lens of the lens array acquires information at each partial pupil.

A viewpoint and a depth of field of the observation image corresponding to the partial pupil depend respectively on a center and spread of the partial pupil. A mark x in FIG. 2A represents the viewpoint of each partial pupil. Performing image capturing from such multiple viewpoints enables acquiring multiple viewpoint images (a light field).

On the other hand, setting partial pupils 303a to 303d concentrically as illustrated in FIG. 2B makes all viewpoints of these partial pupils 303a to 303d coincident with one another, which precludes the acquisition of the light field.

No acquisition of the light field makes it impossible not only to perform a viewpoint change after image capturing, but also to acquire three-dimensional information of the object space.

However, also in the setting of the partial pupils illustrated in FIG. 2B, since spreads of the partial pupils 303a to 303d are mutually different, depth information can be acquired by DFD (Depth From Defocus).

Furthermore, if there are captured images captured through these partial pupils 303a to 303d, reconstruction of these captured images enables controlling the depth of field after the image capturing thereof.

Embodiments of the present invention aiming to acquiring multiple captured images corresponding to mutually different pupils include both the cases where the partial pupils are set as illustrated in FIGS. 2A and 2B.

[Embodiment 1]

Figure 3B:
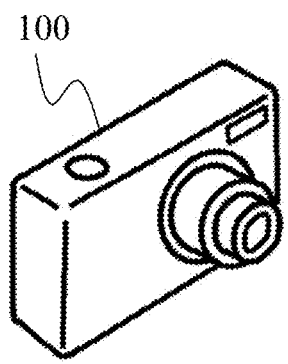
FIG. 3B is an external view of the image capturing apparatus.

Description will be made of a configuration of an image capturing apparatus (camera) 100 including an image sensor, which is a first embodiment (Embodiment 1) of the present invention with referring to FIG. 3A. FIG. 3B illustrates an external view of the image capturing apparatus 100. Light from an object space enters an image acquirer 101 to be changed thereby into an image signal.

The image acquirer 101 includes an imaging optical system 102 that images the light from the object space and an image sensor 104 including multiple pixels and a transmittance distribution provider 103. In this example, each pixel of the image sensor 104 includes one photoelectric converter. However, each pixel may include two or more photoelectric converters as described later in Embodiment 2. The image sensor 104 may be configured such that pixels of at least part of all the multiple pixels include the transmittance distribution provider 103.

The image sensor 104 is constituted by a photoelectric conversion element such as a CCD (Charge Coupled Device) sensor and a CMOS (Complementary Metal-Oxide Semiconductor) sensor. The image sensor 104 photoelectrically converts an optical image (specifically, an overlap image in which multiple observation images overlap one another) formed by the imaging optical system 102. A detailed configuration of the image acquirer 101 will be described later.

The image sensor 104 outputs an analog electric signal generated by its photoelectric conversion. The analog electric signal is converted by an A/D converter 105 into an image capture signal as a digital signal. The image capture signal is input to an image processor 106.

The image processor 106 performs predetermined processes such as noise reduction on the image capture signal to produce a captured image as an input image. The captured image is stored to an image recording medium 108 such as a semiconductor memory in a predetermined format.

The image recording medium 108 also stores information on an image capturing condition showing a state of the image capturing apparatus 100 when image capturing is performed. The image capturing condition is obtained from a state detector 109. The image capturing condition includes an image capturing distance (or an object distance), an aperture value and a focal length (in a case where the imaging optical system 102 is a zoom lens). The state detector 109 may acquire the information on the image capturing condition from a system controller 110 and may acquire information on the image acquirer 101 from a controller 111.

The captured image is image data acquired by the image capturing of the overlap image in which the multiple observation images corresponding to the multiple partial pupils overlap one another, by using the image sensor 104 that includes the multiple pixels providing mutually different transmittance distributions to the respective observation images (that is, the respective partial pupils).

When performing image display on a display unit 112, the image processor 106 produces (separates), from the captured image stored in the image recording medium 108, a viewpoint image corresponding to the observation image observable through (that is, corresponding to) a certain pupil. The image processor 106 displays, depending on a display condition selected by a user, the viewpoint image or a process target image (such as a refocus image) newly produced from the viewpoint image on the display unit 112.

The image processor 106 includes an information acquirer 106a, a parameter setter 106b, an estimated image producer 106c, an estimation completion determiner 106d and an output image producer 106e. Processes performed by these parts will be described later by using a flowchart. Furthermore, the image processor 106 reads out, from a memory 107, information on the transmittance distributions provided to the respective pixels by the transmittance distribution provider 103 to use the information for producing output images.

The output image displayed on the display unit 112 may be stored to the image recording medium 108. Moreover, in order to accelerate the processes to the image display, the captured image acquired by using the image sensor 104 may be directly used for producing the output image without storing it to the image recording medium 108.

The system controller 110 performs the above-described series of control, and the controller 111 performs mechanical drive of the imaging optical system 102 (for example, drive of an aperture stop and lenses) in response to indications from the system controller 110.

Next, a detailed description will be made of a configuration of the image acquirer 101 in this embodiment with referring to FIG. 1.

The image sensor 104 is constituted by the above-described multiple pixels and a minute lens array 201 including multiple minute lenses each being provided to each pixel.

Each of the multiple pixels includes one photoelectric convertor (202a, 202b, 202c, . . . ; hereinafter collectively denoted by 202) such as a photodiode.

The minute lens array 201 and an object plane 302 are provided with a conjugate relation by the imaging optical system 102. Furthermore, the pupil (collective pupil in this embodiment) 301 of the imaging optical system 102 and the photoelectric convertor 202 are provided with an approximately conjugate relation by the minute lens array 201.

It is not necessarily needed that an actual object (such as a person or an object) is present on the object plane 302. This is because the image capturing using the image sensor 104 and the image process after the image capturing provides information on the light field (that is, the multiple viewpoint images), and performing the refocus using that information provides an image in focus on an object located farther or closer than the object plane 302.

Each of the multiple pixels of the image sensor 104 is provided with a transmittance distribution provider (103a, 103b, 103c, . . . ; hereinafter also collectively denoted by 103)

Figure 4:
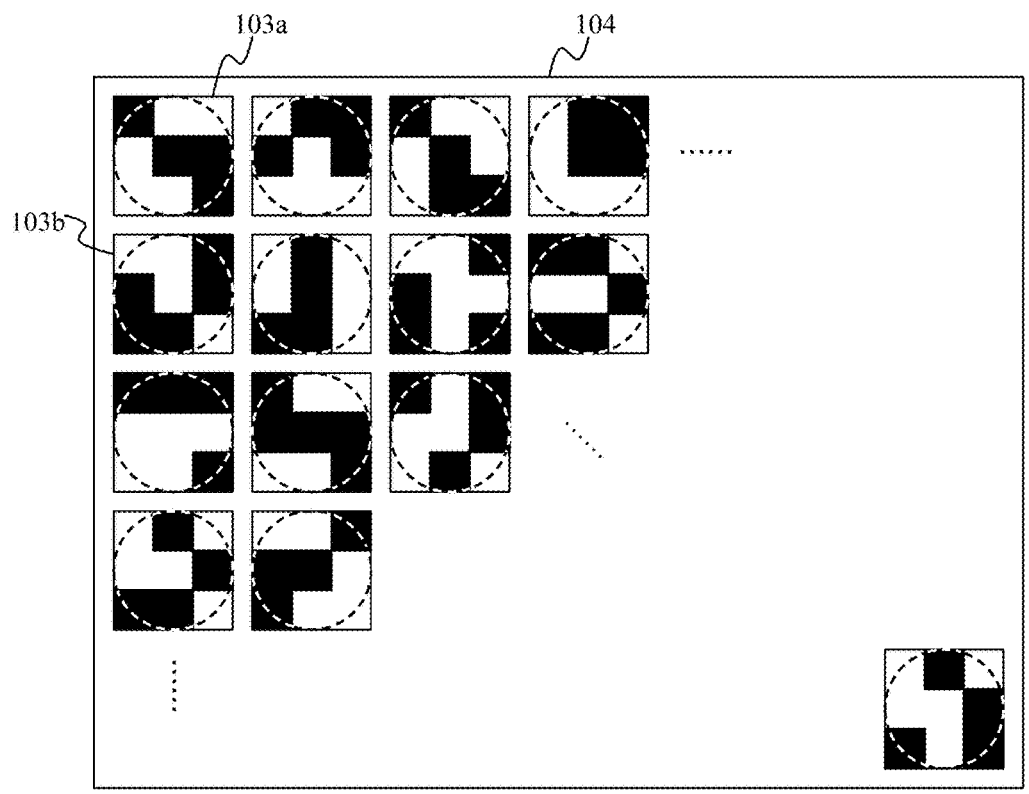
FIG. 4 illustrates transmittance distribution providers in Embodiment 1.

FIG. 4 illustrates configurations of the transmittance distribution providers 103 (103a, 103b, 103c, . . . ) provided for the respective pixels. Each transmittance distribution provider 103 has a light-transmissive portion and a light-blocking portion (or only the light-transmissive portion as described later). In FIGS. 1 and 4, a black portion shows the light-blocking portion (light-blocker), and a white portion shows the light-transmissive portion.

FIG. 4 illustrates that, in the respective pixels of the image sensor 104, the light-blocking portions of the transmittance distribution providers 103 are provided so as to block light in mutually different areas. A dashed circle in FIG. 4 represents an optical image of the collective pupil 301 (hereinafter referred to as "a collective pupil image") of the imaging optical system 102 formed on the photoelectric convertor 202 of each pixel. In each pixel, the light-blocking portion blocks light in one or more areas in the collective pupil image corresponding to one or more partial pupils.

That is, the transmittance distribution providers 103 in the respective pixels illustrated in FIG. 4 each provide, in each pixel, transmittances different depending on positions of the partial pupils and arrange the light-blocking potions in the respective pixels so as to provide mutually different distributions of the transmittances to the respective pixels. The distribution of the transmittances in each pixel is hereinafter referred to as "a transmittance distribution".

As understood from FIG. 1, since the position of the partial pupil and an incident angle at which light passing through that partial pupil enters the pixel have a correspondence relation to each other, the transmittance distribution depending on the positions of the partial pupils is synonymous with the transmittance distribution depending on the incident angles of light.

In this embodiment, as illustrated in FIG. 2A, the collective pupil 301 is divided into nine partial pupils 301a to 301i.

When the collective pupil 301 is constituted by the four concentric partial pupils 303a to 303d as illustrated in FIG. 2B, the light-transmissive portions and the light-blocking portions of the transmission distribution provider 103 may be concentrically arranged as with the concentric partial pupils.

Figures 5A, 5B, 5C:
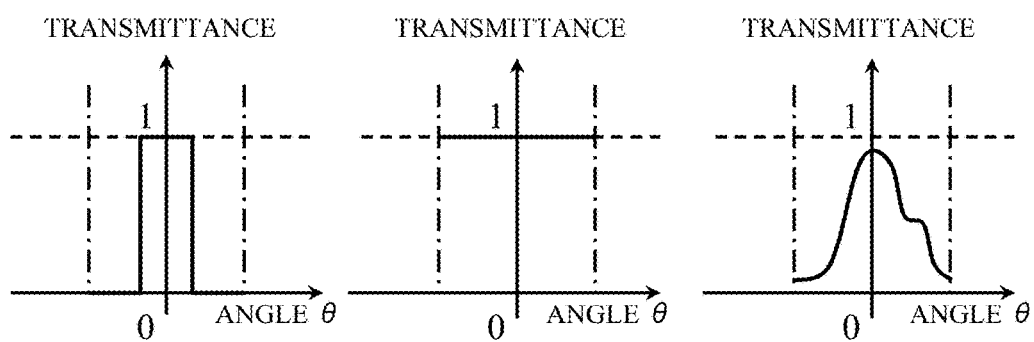
FIGS. 5A to 5C illustrate examples of the transmittance distributions in Embodiment 1 (to 3).

A central pixel located on an optical axis of the imaging optical system 102 among the multiple pixels of the image sensor 104 has, for example, a transmittance distribution as illustrated in FIG. 5A.

Although an actual transmittance distribution in one pixel is a two-dimensional distribution, FIGS. 5A, 5B and 5C each illustrate one-dimensional distribution.

Dashed-dotted lines in each of FIGS. 5A to 5C represent an incident angle limit of light entering the central pixel.

The transmittance distributions in this embodiment include an even distribution in which transmittances for all incident angles of light to the pixel are uniform (constant), as illustrated in FIG. 5B.

That is, providing a transmittance of 1 to all the incident angles of light to the pixel also means providing a transmittance distribution by a transmittance distribution provider 103 constituted only by the light-transmissive portion.

In addition, the transmittance distributions include, not only a binary distribution (in which the transmittance is 1 or 0) as illustrated in FIG. 5A, but also a distribution in which the transmittance continuously changes with respect to the incident angle of light as illustrated in FIG. 5C.

Since in FIGS. 5A to 5C the pixel (central pixel) is located on the optical axis (vertical axis) of the imaging optical system 102, the dashed-dotted lines in each of FIGS. 5A to 5C are axially symmetric with respect to the vertical axis.

However, in a pixel shifted from the optical axis of the imaging optical system 102, the incident angle limit of light is also shifted depending on an amount of the shift along a horizontal axis in each of FIGS. 5A to 5C.

When determining whether or not the transmittance distributions of two pixels are identical to each other, these transmittance distributions are compared with each other after the shift is removed.

Next, description will be made of the captured image by using the image sensor 104.

Although the following description will be made of, as an example, a case where the observation images corresponding to the partial pupils 301a to 301c are captured, the same description also applies to a case where the observation images corresponding to other partial pupils are captured.

Figure 6:
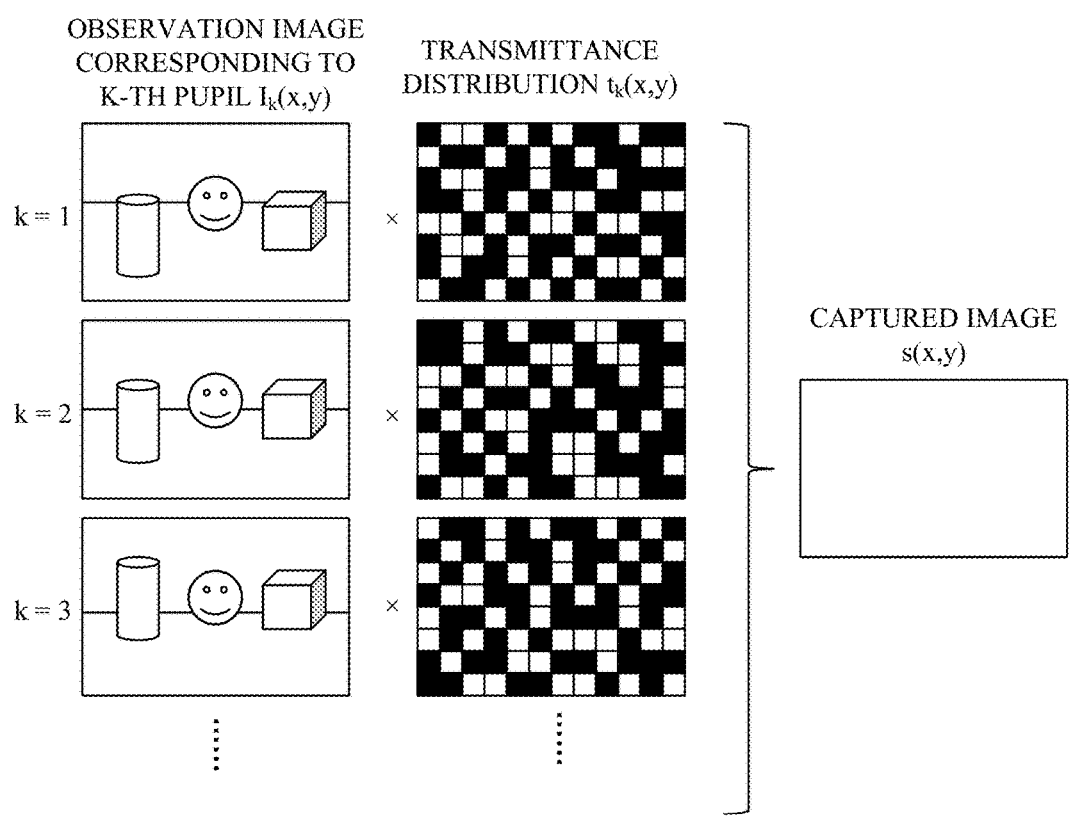
FIG. 6 illustrates an input image in Embodiment 1 (to 3).

The observation image corresponding to the partial pupil 301a can be reproduced by collecting only light passing through the partial pupil 301a. Since the collective pupil 301 of the imaging optical system 102 is inversely imaged on the photoelectric convertor 202, light forming the observation image corresponding to the partial pupil 301a located in an upper left part in FIG. 2A enters a lower right area of each pixel. In FIG. 6, the observation image $I_k(x,y)$ corresponding to this partial pupil 301a is illustrated in an upper part (k=1).

The transmittance distribution providers 103 in the multiple pixels provide, based on this observation image corresponding to the partial pupil 301a, the transmittances of the lower right areas of the respective pixels illustrated in FIG. 4, and thereby a transmittance distribution $T_k(x,y)$ illustrated in the upper part in FIG. 6 in which the provided transmittances are arranged is formed. Transmittance distributions $T_k(x,y)$ based on the other observation images $I_k(x,y)$ corresponding to the partial pupils 301b and 301c are formed in the same manner; a middle part (k=2) in FIG. 6 illustrates the observation image corresponding to the partial pupils 301b and the transmittance distribution based thereon, and a lower part (k=3) therein illustrates the observation image corresponding to the partial pupils 301c and the transmittance distribution based thereon.

As understood from FIG. 6, the image sensor 104 provides mutually different transmittance distributions $T_k(x,y)$ for the observation images $I_k(x,y)$ corresponding to the respective partial pupils and acquires a captured image $s(x,y)$ in which these observation images overlap one another. In FIG. 6, in the captured image $s(x,y)$ acquired by the image sensor 104, illustrations of the captured object space and an average transmittance distribution provided by the overlap are omitted.

The captured image $s(x,y)$ is expressed by following numeral expression (1):

$$s(x, y) = \sum_{k=1}^{K} t_k(x, y) I_k(x, y) + \eta(x, y) \quad (1)$$

where x and y respectively represent a horizontal coordinate and a vertical coordinate, $\eta(x,y)$ represents a noise, K (=9 in this embodiment) represents a total number of the overlapped observation images (that is, a number of the partial pupils), $I_k(x,y)$ represents a light intensity distribution of the observation image corresponding to a k-th partial pupil, and $t_k(x,y)$ represents the transmittance distribution set for $I_k(x,y)$.

Although the transmittance distribution $t_k(x,y)$ in expression (1) shows a change in the transmittance with a change in the coordinates (x,y) as a variable, the distribution of the transmittances depending on the incident angle of light to the pixel illustrated in FIGS. 5A to 5C is also called a transmittance distribution.

Expression (1) is rewritten to following expression (2) in matrix form:

$$s = Hi + \eta \quad (2)$$

where s, i, and $\eta$ respectively represent a vector (input image vector) of the captured image acquired by the image sensor 104, a vector (observation image vector) of the observation image corresponding to each partial pupil and a vector (noise vector) of a noise, and H represents a matrix showing the provision of the transmittance distribution and the overlap of the observation images.

The observation image vector i is, for example as expressed by following expression (3), a column vector whose components are observation image vector $i_k$ corresponding to the k-th partial pupil.

$$i = \begin{pmatrix} i_1 \\ i_2 \\ \vdots \\ i_K \end{pmatrix} \quad (3)$$

When the observation image $I_k(x,y)$ corresponding to the k-th partial pupil has M×N components, $i_k$ is a column vector having MN×1 components expressed by following expression (4).

$$i_k = \begin{pmatrix} I_k(x_1, y_1) \\ I_k(x_2, y_1) \\ \vdots \\ I_k(x_M, y_1) \\ I_k(x_1, y_2) \\ \vdots \\ I_k(x_M, y_N) \end{pmatrix} \quad (4)$$

The input image vector s and the noise vector $\eta$ are also column vectors each having MN×1 components and are respectively expressed by following expressions (5) and (6).

$$s = \begin{pmatrix} s(x_1, y_1) \\ s(x_2, y_1) \\ \vdots \\ s(x_M, y_N) \end{pmatrix} \quad (5)$$

$$\eta = \begin{pmatrix} \eta(x_1, y_1) \\ \eta(x_2, y_1) \\ \vdots \\ \eta(x_M, y_N) \end{pmatrix} \quad (6)$$

The matrix H showing the provision of the transmittance distribution and the overlap of the observation images is a matrix having MN×KMN components expressed by following expression (7):

$$H = (G_1 \ G_2 \ \ldots \ G_K) \quad (7)$$

where $G_k$ represents a matrix having MN×MN components expressed by following expression (8).

$$G_k = \begin{pmatrix} t_k(x_1, y_1) & 0 & 0 & \ldots & 0 & 0 \\ 0 & t_k(x_2, y_1) & 0 & \ldots & 0 & 0 \\ & & & \vdots & & \\ 0 & 0 & 0 & \ldots & 0 & t_k(x_M, y_N) \end{pmatrix} \quad (8)$$

In this embodiment, since the observation images corresponding to the partial pupils 301a to 301i overlap one another without any positional shift, the matrix $G_k$ has only diagonal components as shown by expression (8).

However, when the observation images corresponding to the partial pupils 301a to 301i overlap one another with a positional shift, expression (8) has a finite value of each non-diagonal component depending on an amount of the positional shift.

Furthermore, the image sensor 104 is featured in that, when a certain one pixel (first pixel) and all pixels (second pixels) adjacent to the one pixel are collectively referred to as "an adjacent pixel group", each of multiple adjacent pixel groups includes pixels having mutually different four or more kinds of transmittance distributions. Effects provided by this feature will be described later in description of a flowchart of FIG. 10.

Figure 7A:
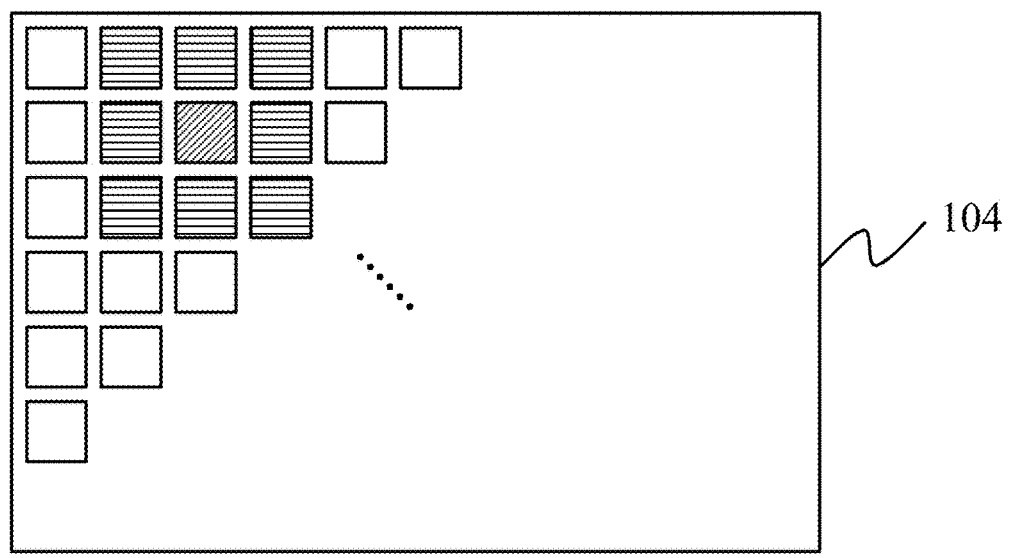
FIGS. 7A and 7B each illustrate adjacent pixel group in Embodiment 1 (to 3).
Figure 7B:
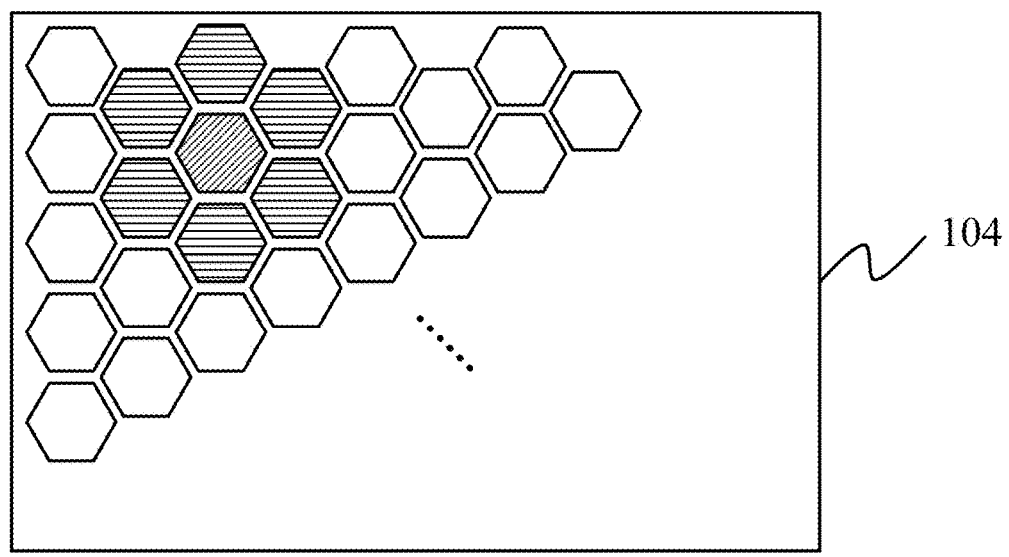

The adjacent pixel group includes, in the image sensor 104 whose pixels are arranged like a lattice as illustrated in FIG. 7A, one pixel (first pixel) with hatched lines and eight pixels (second pixels) with horizontal lines which are adjacent to the one pixel in upper, lower, right, left and oblique directions. On the other hand, in the image sensor 104 whose pixels are arranged like a honeycomb structure as illustrated in FIG. 7B, the adjacent pixel group includes one pixel (first pixel) with hatched lines and six pixels (second pixels) with horizontal lines which are adjacent to the one pixel in upper, lower, and oblique directions.

The number of the kinds of transmittance distributions in the adjacent pixel group is counted as follows. In the adjacent pixel group (nine pixels) illustrated in FIG. 7A, when all the nine pixels have mutually different transmittance distributions, the number of the kinds of transmittance distributions is nine kinds. For example, when two or more pixels have a transmittance distribution A, one pixel has a transmittance distribution B, another one pixel has a transmittance distribution C and two or more pixels have a transmittance distribution D, the number of the kinds of transmittance distributions is four kinds (A, B, C and D).

Next, description will be made of the image process performed by the image processor 106 with referring to a flowchart of FIG. 8.

The image processor 106 performs this image process (estimation process) to separate, from the input image as the captured image including information on the overlapped observation images corresponding to the multiple partial pupils 301a to 301i, viewpoint images (output images) corresponding to the partial pupils.

At step S101, the information acquirer 106a acquires the input image illustrated in FIG. 6 and expressed by s(x,y) in expression (1) and the information on the transmittance distributions illustrated in FIG. 6 and expressed by $t_k(x,y)$ in expression (1) provided to the observation images corresponding to the partial pupils.

At step S102, the parameter setter 106b sets parameters used for the estimation process. The parameters used for the estimation process include a regularization term described at next step S103 and its weight, a number of times of iterative operations, a convergence condition used at later-described step S104 and others. Furthermore, the parameters may include an indication of the partial pupil to which the viewpoint image as the output image correspond. In this case, the output image may be only one viewpoint image corresponding to one of the partial pupils 301a to 301i or may be nine viewpoint images corresponding to all the partial pupils 301a to 301i. This embodiment outputs the nine viewpoint images corresponding to all the partial pupils 301a to 301i.

A definition may be made of a new partial pupil formed by adding two or more of the partial pupils 301a to 301i, and a viewpoint image corresponding to the newly defined partial pupil may be output. This case will be described in detail later.

At step S103, the estimated image producer 106c produces estimated images. The estimated images are the viewpoint images corresponding to the partial pupils 301a to 301i. Producing the estimated images is equivalent to calculating the observation image vector i corresponding to each partial pupil from the input image vector s and the matrix H by expression (2).

This is equivalent to acquiring a solution of simultaneous linear equations, as understood from expressions (1) and (2). However, in spite of the fact that a number of unknowns (a number of rows of the observation image vector i) is KMN, a number of the simultaneous equations (a number of rows of matrix H) is MN. Furthermore, the number of unknowns including an unknown noise is (K+1)MN. For this reason, a unique solution cannot be found, and therefore the estimation process is inevitably needed in order to acquire the observation image vector i.

When not performing the estimation process, the observation image vector i can be acquired by decreasing an image resolution (the number of rows of the observation image vector i). That is, the observation image vector i can be acquired by matching the number of the unknowns (the number of rows of the observation image vector i) to the number of the simultaneous equations (the number MN of row of the matrix H). In this case, the resolution of the viewpoint image corresponding to the partial pupil is decreased from MxN to $(M/K^{0.5}) \times (M/K^{0.5})$. This is equivalent in this embodiment to making all values of $I_k(x,y)$ of nine pixels surrounded by a dashed line in FIG. 9 equal to one another. On the nine pixels surrounded by the dashed line, nine observation images (unknowns) $I_k(x,y)$ are add together with mutually different transmittances (coefficients), so that nine simultaneous linear equations are obtained. Since the number of the equations coincides with that of the unknowns if each linear equation is independent from the others, the observation image vector i that is a solution can be acquired.

However, this method only enables providing the same amount of information on the light field as that provided by the camera disclosed in PCT International Application Publication No. WO2006/039486. Thus, this embodiment uses the estimation process to acquire a high resolution light field.

In this case of using the estimation process, increasing the number of mutually independent equations in the above-described simultaneous linear equations improves estimation accuracy. In order to make the equations mutually independent, at least their coefficients (transmittance distributions) must be mutually different. For this reason, it is desirable that pixels mutually arranged nearby do not have mutually identical transmittance distributions.

The number of the linear equations changes depending on the division number of the partial pupils. However, since the pupil is horizontally and vertically divided into at least two, it is desirable that, in the adjacent pixel group, a number of pixels having the mutually identical transmittance distributions be small.

Therefore, the image sensor 104 is configured such that, as described above, the adjacent pixel group includes the pixels having the mutually different four or more kinds of transmittance distributions. This configuration reduces a deterioration of the estimation accuracy and thereby enables acquiring high-resolution viewpoint images (that is, a high-resolution light field) corresponding to the mutually different partial pupils.

In the image sensor 104 illustrated in FIG. 4, all the first and second pixels included in each of the adjacent pixel groups have mutually different transmittance distributions. Furthermore, when focusing on mutually adjacent four pixels in the image sensor 104, the four pixels have mutually different transmittance distributions.

Next, the estimation process to acquire the estimated images (viewpoint images) corresponding to the partial pupils from the input image will be described.

The estimated image is produced by calculating a solution of an optimization problem expressed by following expression (9):

$$\arg\min_{v}[L(Hv) + \Phi(v)] \quad (9)$$

where v represents a vectorized estimated image (estimated image vector), L represents a loss function, and Φ represents a regularization term for v. A specific description thereof will be made later.

The loss function L has an effect of fitting the solution to a model (the simultaneous equations expressed by expression (2) in this embodiment).

However, as described above, since the simultaneous equations expressed by expression (2) have a smaller number of equations than that of the unknowns, the solution cannot be uniquely calculated. For this reason, this embodiment uses the regularization term Φ having an effect of converging the solution to a feasible one.

The regularization term uses a prior knowledge as a character that the solution (observation image vector i) should have.

The regularization term also has a role of preventing an excessive fitting (that is, a reflection of an influence of the noise vector η on the estimated image vector v) that is caused when the loss function is only considered.

The estimated image vector v is a column vector having an estimated image vector $v_k$ corresponding to the k-th partial pupil as a component, as expressed by following expression (10).

$$v = \begin{pmatrix} v_1 \\ v_2 \\ \vdots \\ v_K \end{pmatrix} \quad (10)$$

When the estimated image corresponding to when the object space is observed through the k-th partial pupil is represented by $V_k(x,y)$, $v_k$ is a column vector having, as $i_k$ expressed by expression (4), MN×1 components expressed by following expression (11).

$$v_k = \begin{pmatrix} V_k(x_1, y_1) \\ V_k(x_2, y_1) \\ \vdots \\ V_k(x_M, y_N) \end{pmatrix} \quad (11)$$

Description will be made of specific examples of the loss function in expression (9) and the regularization term.

As the loss function, a function shown by following expression (12) can be used:

$$L(Hv) = \frac{1}{2}\|Hv - s\|_2^2 \quad (12)$$

where $\|\ \|_p$ is a symbol expressing a $L_p$ norm, and expressing a Euclidean norm when P equal to 2.

The examples of the regularization term include a $L_1$ norm shown by following expression (13):

$$\Phi(v) = \lambda \sum_{k=1}^{K} \|\Psi v_k\|_1 \quad (13)$$

where λ represents a parameter showing a weight of the regularization term, Ψ represents a matrix expressing a basis transformation such as a wavelet transform and a discrete cosine transform.

The regularization term expressed by expression (13) is based on a character that the basis transformation such as the wavelet transform and the discrete cosine transform performed on an image makes signal components of the image sparse, that is, enables expressing the image by a smaller number of signals. Following reference document 1 describes the regularization term in detail.

Reference document 1: Richard G. Baraniuk, "Compressive Sensing", IEEE SIGNAL PROCESSING MAGAZINE [118] July 2007

Although expression (13) uses the identical weight λ for all the partial pupils, weights different depending on k may be used.

Furthermore, as the regularization term, a Tikhonov regularization term and a Total Variation (TV) norm regularization term which are respectively shown by following expressions (14) and (15) may be used:

$$\Phi(v) = \lambda \|v\|_2^2 \tag{14}$$

$$\Phi(v) = \lambda \sum_{k=1}^{K} \|\nabla v_k\|_{TV} = \lambda \sum_{k=1}^{K} \sqrt{(\partial_x V_k)^2 + (\partial_y V_k)^2} \tag{15}$$

where $\partial_x V_k$ and $\partial_y V_k$ respectively represent primary differentiations on the estimated image $V_k$ in x and y directions.

The estimation formula (9) expressing the optimization problem may be solved by using a method including iterative operations, and by using a conjugate gradient method when the regularization term expressed by expression (14) is used. In addition, when the regularization term expressed by expression (13) or (15) is used, a TwIST (Two-step Iterative Shrinkage/Thresholding) method or the like may be used. Following reference document 2 describes the TwIST method in detail.

Reference document 2: J. M. Bioucas-Dias, et al., "A new TwIST:two-step iterative shrinkage/thresholding algorithms for image restoration", IEEE Trans.on Image Processing, vol. 16, December 2007

Moreover, when performing these iterative operations, the parameters such as the weight λ of the regularization term may be updated at each iterative operation.

Using the above-described method for solving the optimization problem enables acquiring the estimated images corresponding to the partial pupils 301a to 301i.

At step S104, the estimation completion determiner 106d determines whether or not the estimated images produced at previous step S103 satisfy a predetermined condition.

If the estimated images satisfy the predetermined condition, the image processer 106 proceeds to step S105.

The predetermined condition is, for example, a condition that the number of times of the iterative operations performed at step S103 has reached a predetermined number of times or more, or a condition that a change of the estimated image updated by the iterative operation has reduced below a predetermined value.

If the estimated image does not satisfy the predetermined condition, the image processor 106 returns to step S103, and thereat the estimated image producer 106c further increases the number of times of the iterative operations to produce the estimated images.

At step S105, the output image producer 106e outputs the estimated images produced at step S103 as the output images.

The above-described process enables acquiring, from the input image acquired by the image sensor 104, the output images (viewpoint image) corresponding to the mutually different partial pupils 301a to 301i.

Next, description will be made of desirable conditions for enhancing the effect of this embodiment.

At step S103, the estimated image producer 106c adds, to the method of solving the simultaneous equations by decreasing the image resolution (the method described using FIG. 9 at step S103), the estimation expressed by expression (9) to produce the output images with a high resolution.

This conversely means that, under a condition that a highly accurate solution can be calculated in the method of solving the simultaneous equations by decreasing the image resolution, even a process to which the estimation expressed by expression (9) is added similarly improves the estimation accuracy. The condition is, as described above, that the simultaneous linear equations are mutually independent. Pixels having mutually identical transmittance distributions included in the simultaneous linear equations decreases the number the mutually independent equations. For this reason, it is desirable that the adjacent pixel group include pixels having mutually different six or more kinds of transmittance distributions.

Furthermore, it is desirable that, of the adjacent pixel group in the image sensor 104, the number of pixels having mutually identical transmittance distributions be ¼ or less of that of all pixels included in the adjacent pixel group.

It is more desirable that the pixels having mutually identical transmittance distributions be not included in the adjacent pixel group (that is, the transmittance distributions of all the pixels in the adjacent pixel group be mutually different).

Moreover, the above-described simultaneous linear equations can be established to all the pixels in the image sensor 104.

In order to highly accurately estimate the solution of the simultaneous equations in a wide image area, it is desirable that the following conditions be further satisfied.

That is, when the first pixel (with the hatched lines in FIGS. 7A and 7B) of the adjacent pixel group satisfying the condition that the pixels having the four or more kinds of transmittance distributions are included is referred to as "a specific pixel", it is desirable that a number of the specific pixels be half or more of that of all the pixels in the image sensor 104.

It is more desirable that all the pixels of the image sensor 104 be the specific pixels. This enables acquiring a high estimation accuracy over the entire image area. Defining the specific pixel as the first pixel when the pixels having the mutually identical transmittance distributions do not included in the adjacent pixel group enables acquiring a higher estimation accuracy in a wider image area.

Although the above description was made of the adjacent pixel group including the first pixel and the second pixels adjacent thereto, more accurately, it is desirable to change a size of a focused pixel group depending on the number of the simultaneous linear equations (that is, the number of the viewpoint images corresponding to the divided partial pupils) to determine the independency.

Furthermore, transmittance distributions each expressed by a linear combination of multiple transmittance distributions in the adjacent pixel group have a linearly dependent relation even though these combined transmittance distributions are not mutually completely identical. For this reason, satisfying the following condition enables further enhancing the above-described effect.

As to each pixel in a pixel group including an arbitrary first pixel $(x_m, y_n)$ (m=1, ..., M and n=1, ..., N) and third pixels surrounding the first pixel (the third pixels include the second pixels adjacent to the first pixel), a consideration will be made of a degree of linear independency of a vector having a transmittance for each k as its component.

Since the transmittances express coefficients of simultaneous linear equations, the vectors are is referred to as "a coefficient vector", and a matrix in which the coefficient vectors are arranged is represented by E. In order to improve the estimation accuracy of the estimated image, the matrix E is desirable to satisfy a condition expressed by following expression (16).

$$0.5 \leq \frac{1}{K} \text{rank} E \leq 1 \tag{16}$$

In this embodiment, when a is defined by following expression (17), the matrix E is given by following expression (18):

$$a = ceil\left(\frac{ceil(\sqrt{K})-1}{2}\right) \quad (17)$$

$$E = \begin{pmatrix} t_1(x_{m-a}, y_{n-a}) & t_2(x_{m-a}, y_{n-a}) & \cdots & t_k(x_{m-a}, y_{n-a}) \\ t_1(x_{m-a}, y_{n-a+1}) & t_2(x_{m-a}, y_{n-a+1}) & \cdots & t_k(x_{m-a}, y_{n-a+1}) \\ & & \vdots & \\ t_1(x_m, y_n) & t_2(x_m, y_n) & \cdots & t_k(x_m, y_n) \\ & & \vdots & \\ t_1(x_{m+a}, y_{n+a}) & t_2(x_{m+a}, y_{n+a}) & \cdots & t_k(x_{m+a}, y_{n+a}) \end{pmatrix} \quad (18)$$

where ceil in expression (17) represents a ceiling function.

Figure 9:
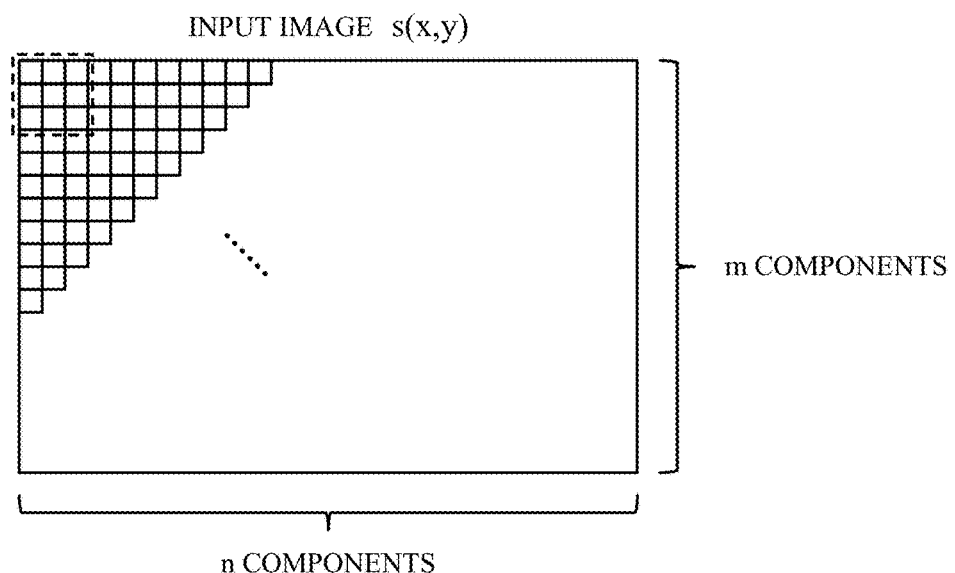
FIG. 9 illustrates a decrease of resolution of a viewpoint image in Embodiment 1.

In the method described using FIG. 9 which solves the simultaneous equations by decreasing the resolution, the matrix E is constituted by the coefficients of the respective equations (in this embodiment, the matrix E is a 9×9 matrix). That is, as a rank of the matrix E becomes closer to K that is a number of unknowns in one pixel, the estimation accuracy further improves. Therefore, it is desirable that the transmittance distribution satisfy the conditions of expression (16) for all the pixels $(x_m, y_n)$.

In this embodiment, since the observation images corresponding to the partial pupils overlap one another without any positional shift, components of each row vector (coefficient vector) in the matrix E have mutually identical coordinates. However, when the observation images overlap one another with a positional shift, those coordinates also mutually shift corresponding thereto.

It is more desirable to change the range of expression (16) to that of following expression (19).

$$0.7 \leq \frac{1}{K} rankE \leq 1 \quad (19)$$

It is further desirable to change the range of expression (16) to that of following expression (20).

$$0.9 \leq \frac{1}{K} rankE \leq 1 \quad (20)$$

Moreover, when a distribution obtained by averaging the transmittance distributions provided to the respective overlapped observation images corresponding to the partial pupils in the input image for each k (partial pupil) is referred to as an angular average transmittance distribution $t_{kave}$, it is desirable that a minimum value $t_{kave,min}$ of the angular average transmittance distribution $t_{kave}$ be larger than zero.

The angular average transmittance distribution $t_{kave}$ is expressed by following expression (21) when the same notation as that of expression (1) is used.

$$t_{kave}(x, y) = \frac{1}{K}\sum_{k=1}^{K} t_k(x, y) \quad (21)$$

Although expression (21) calculates the angular average transmittance distribution $t_{kave}$ by totaling the transmittance distributions for each k (partial pupil), the angular average transmittance distribution $t_{kave}$ may be calculated by totaling the transmittance distributions for the incident angles of light to the pixel.

If a pixel $(x_m, y_n)$ is present where the angular average transmittance distribution $t_{kave}$ is 0, no light enters that pixel at all. Acquiring the estimated image vector v is equivalent to estimating the solution of the simultaneous equations as described above. If the pixel is present where no light enters, all the coefficients (transmittances $t_k$) of the linear equation for that pixel are 0, so that the number of the equations in the simultaneous linear equations decreases. Thus, in order not to decrease the number of the equations, it is desirable that the angular mean transmittance distribution, it is desirable that the minimum value $t_{kave,min}$ of the angular average transmittance distribution $t_{kave}$ be larger than zero.

When a value obtained by averaging an average value of the transmittance distributions in each pixel over all the pixels, that is, a coordinate average of the angular average transmittance distributions is represented by $t_{kave,xyave}$, it is desirable to satisfy a condition of following expression (22).

$$0.1 \leq t_{kave,xyave} = \frac{1}{MN}\sum_{m,n}^{M,N} t_{kave}(x_m, y_n) \leq 0.9 \quad (22)$$

Expression (22) expresses a ratio of a light quantity acquired by the image sensor 104 to that in a case of providing no transmittance distribution. Since an S/N ratio decreases as the light quantity decreases, it is desirable that the light quantity ratio be as large as possible. However, as described above, acquiring an accurate estimated image requires a large rank of the matrix E. The value $t_{kave,xyave}$ being a maximum value of 1 means that no transmittance distribution is provided, so that the rank of the matrix E becomes 1. Furthermore, the value $t_{kave,xyave}$ being close to 1 means that the coefficients of the simultaneous linear equations are generally high, that is, have mutually close values. In this case, since the solution of the equation is difficult to be calculated due to an influence of a noise or others, it is desirable to set the value $t_{kave,xyave}$ within the range of expression (22). It is more desirable to set the value $t_{kave,xyave}$ within a range of following expression (23).

$$0.2 \leq t_{kave,xyave} \leq 0.8 \quad (23)$$

It is further desirable to set the value $t_{kave,xyave}$ within a range of following expression (24).

$$0.3 \leq t_{kave,xyave} \leq 0.7 \quad (24)$$

When a maximum value and a minimum value of the transmittance distribution in an arbitrary pixel are respectively referred to as "a maximum transmittance $t_{max}$" and "a minimum transmittance $t_{min}$", it is desirable that a pixel satisfying a condition of following expression (25) be present.

$$0.0 \leq \frac{t_{min}}{t_{max}} \leq 0.6 \quad (25)$$

The minimum transmittance $t_{min}$ and the maximum transmittance $t_{max}$ are coefficients of the simultaneous linear equations to be solved to calculate the estimated image. Since the minimum and maximum transmittances $t_{min}$ and $t_{max}$ close to each other makes, as described above, the calculation of the solution of the equations difficult due to the influence of the noise, it is desirable that the value of $t_{min}/t_{max}$ be equal to or less than the upper limit of expression (25). On the other hand, a negative transmittance does not exist, so that the value of $t_{min}/t_{max}$ theoretically cannot be lower than 0.0 that is the lower limit of expression (25).

It is more desirable that a pixel satisfying a condition of following expression (26) be present.

$$0.0 \le \frac{t_{min}}{t_{max}} \le 0.4 \tag{26}$$

It is further desirable that a pixel satisfying a condition of following expression (27) be present.

$$0.0 \le \frac{t_{min}}{t_{max}} \le 0.2 \tag{27}$$

Furthermore, it is desirable that one-half or more of all the pixels in the image sensor 104 satisfy any one of the conditions of expressions (25) to (27). Satisfying any one of these conditions in these pixels enables improving the estimation accuracy over a wide image area.

Moreover, satisfying any one of the conditions of expressions (25) to (27) in all the pixels of the image sensor 104 enables a highly accurate estimation over the entire image area.

In addition, it is desirable that a ratio of a maximum value $t_{kave,max}$ and the minimum value $t_{kave,min}$ of the angular average transmittance distribution $t_{kave}$ (hereinafter referred to as "a maximum angular average transmittance $t_{kave,max}$" and "a minimum angular average transmittance $t_{kave,min}$") satisfy a condition of following expression (28).

$$0.2 \le \frac{t_{kave,min}}{t_{kave,max}} \le 1 \tag{28}$$

If the maximum and minimum angular average transmittances $t_{kave,max}$ and $t_{kave,min}$ min are away from each other, exposure conditions in respective areas of the input image are mutually significantly different, which may cause "blocked-up shadows" and "luminance saturation" and thereby information to be acquired may be lost. Thus, the estimation accuracy of the estimated image may decrease. Therefore, it is desirable that the maximum and minimum angular average transmittances $t_{kave,max}$ and $t_{kave,min}$ min be close to each other so as to satisfy a condition of expression (28).

It is more desirable to satisfy a condition of following expression (29).

$$0.4 \le \frac{t_{kave,min}}{t_{kave,max}} \le 1 \tag{29}$$

It is further desirable to satisfy a condition of following expression (30).

$$0.6 \le \frac{t_{kave,min}}{t_{kave,max}} \le 1 \tag{30}$$

Next, description will be made of supplementary matters for the production of the output images corresponding to the partial pupils.

The embodiment divides the collective pupil 301 into the nine partial pupils 301a to 301i and provides the mutually different transmittance distributions to the observation images corresponding to the respective partial pupils.

However, it is not necessarily needed to produce (estimate) the output images corresponding to the partial pupils 301a to 301i, and an output image corresponding to a partial pupil in which some of the partial pupils 301a to 301i are added together. Description of this case will be made with referring to FIGS. 10 and 11.

Figure 10:
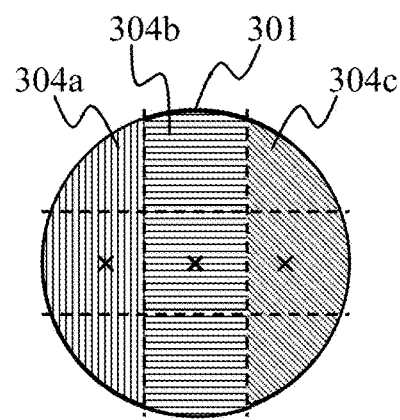
FIG. 10 illustrates another example of the partial pupil in Embodiment 1.

FIG. 10 illustrates an example in which the collective pupil 301 is divided into three partial pupils 304a, 304b and 304c which are respectively illustrated by using vertical lines, horizontal lines and hatched lines. The partial pupil 304a is formed by adding together the partial pupils 301a to 301c illustrated in FIG. 2A. The partial pupil 304b is formed by adding together the partial pupils 301d to 301f illustrated in FIG. 2A. The partial pupil 304c is formed by adding together the partial pupils 301g to 301i illustrated in FIG. 2A. In this case, three output images corresponding to the partial pupils 304a to 304c may be produced.

Figure 11:
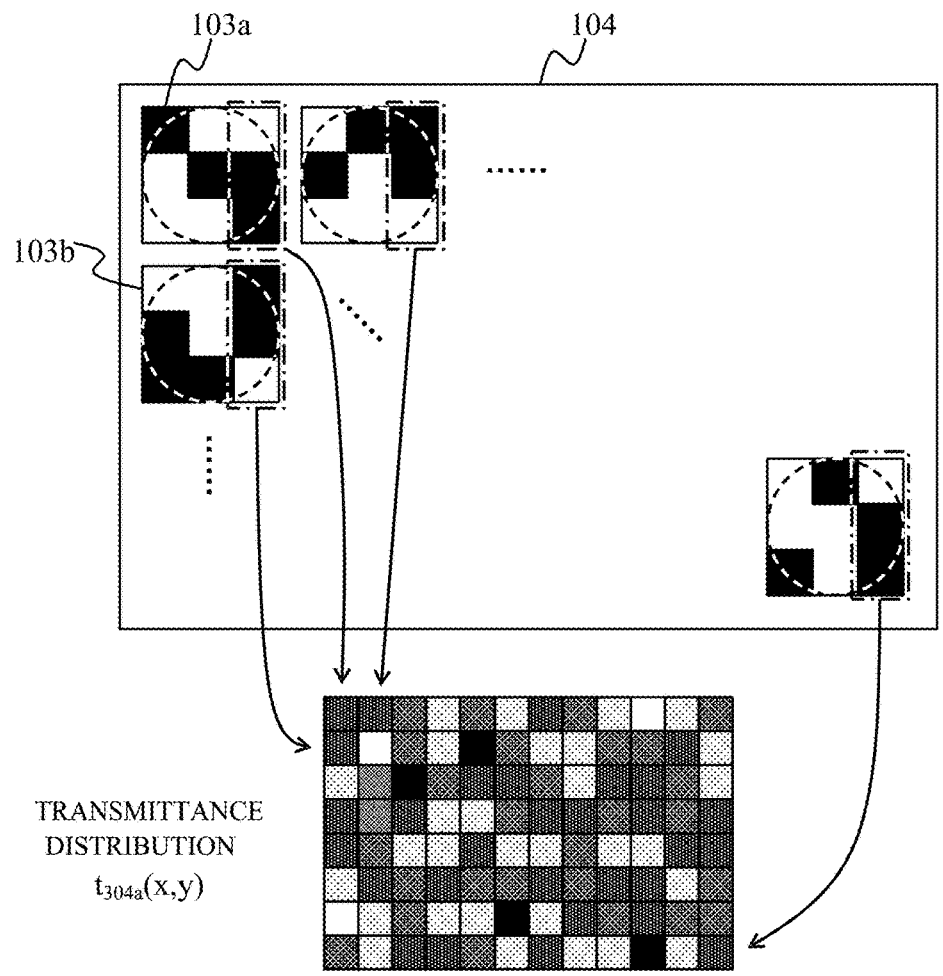
FIG. 11 illustrates a transmittance distribution corresponding to the partial pupil illustrated in FIG. 10.

A transmittance distribution provided to each of observation images corresponding to the partial pupils 304a to 304c is obtained by averaging the transmittance distributions provided to the three added observation images among the nine observation images corresponding to the partial pupils 301a to 301i in FIG. 2A. For example, FIG. 11 illustrates a transmittance distribution $t_{304a}$ provided to the observation image corresponding to the partial pupil 304a. FIG. 11 illustrates the transmittance distribution provider 103 (103a, 103b, . . . ) provided in each pixel of the image sensor 104, as well as FIG. 4.

Averaging the transmittances in an area surrounded by a dashed-dotted line in each pixel illustrated in FIG. 11 and arranging the average transmittances of all the pixels on a two-dimensional plane provides the transmittance distribution $t_{304a}$. The transmittance distribution $t_{304a}$ is expressed by following expression (31):

$$t_{304a}(x, y) = \frac{1}{3} \sum_{j=1}^{3} t_j(x, y) \tag{31}$$

where j=1, j=2 and J=3 respectively represent the partial pupils 301a, 301b and 301c illustrated in FIG. 2A.

Transmittance distributions provided to the observation images corresponding to the other partial pupils 304b and 304c illustrated in FIG. 10 are similarly calculated.

Defining these transmittance distributions as $t_k$ and setting K to 3 makes the above descriptions using expressions (1) to (30) applicable to this case where the partial pupils corresponding to the output images are the partial pupils 304a to 304c.

Figure 12:
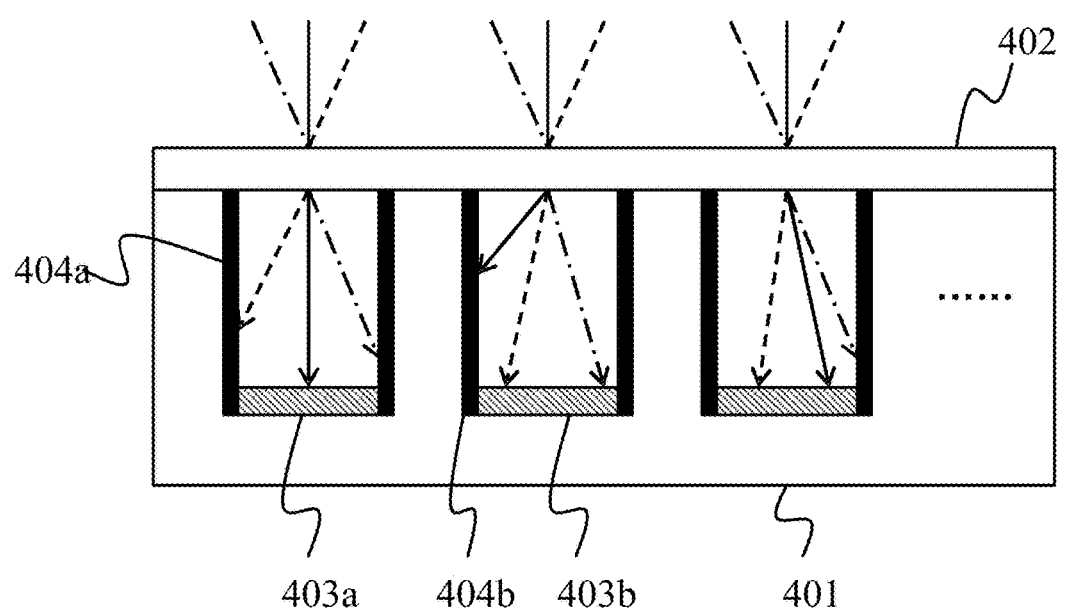
FIG. 12 illustrates another configuration of the image sensor in Embodiment 1.

Instead of the image sensor 104 used in the image acquirer 101 illustrated in FIG. 1, an image sensor 401 having a configuration illustrated in FIG. 12 may be used. The image sensor 401 includes a diffractive element 402 as a transmittance distribution provider, a photoelectric convertor 403 (403a, 403b, . . . ) provided in each pixel and a light blocker 404 (404a, 404b, . . . ) provided to an inner wall of each pixel.

The diffractive elements 402 included in the respective pixels have mutually different diffraction patterns. Each diffractive element 402 increases efficiencies of diffracted lights of different diffraction orders depending on an incident angle of light entering each pixel. A solid line, a dashed line and dashed-dotted line in FIG. 12 each represent a light ray entering the diffractive element 402 and a diffractive light ray whose light quantity is largest among diffracted light rays diffracted thereby.

Light entering the diffractive element 402 proceeds toward the photoelectric convertor 403 or the light blocker 404 depending on its incident angle. The incident angle of the light entering the diffractive element 402 (image sensor 401) corresponds to the partial pupil of the imaging optical system 102 through which this light passes. Therefore, to observation images corresponding to the partial pupils, transmittance distributions different depending on positions of these partial pupils are provided, and a captured image (input image) in which those observation images overlap one another is acquired.

The light blocker 404 of each pixel is provided to prevent light reflected by the inner wall to which the light blocker 404 is provided from entering the photoelectric convertor 403 in that pixel. However, the light blocker 403 can be removed.

The image capturing apparatus 100 of this embodiment enables, with a small number of the pixels of the image sensor 104, producing multiple high resolution images corresponding to optical images observable when an object space is simultaneously observed from mutually different pupils.

[Embodiment 2]

Next, description will be made of a second embodiment (Embodiment 2) of the present invention. This embodiment includes, as separate apparatuses, an image capturing apparatus (camera) acquiring a captured image (input image) and an image processing apparatus producing output images from the input image. In addition, an image sensor provided in the image capturing apparatus includes multiple pixels each including multiple photoelectric convertors.

Figure 13A:
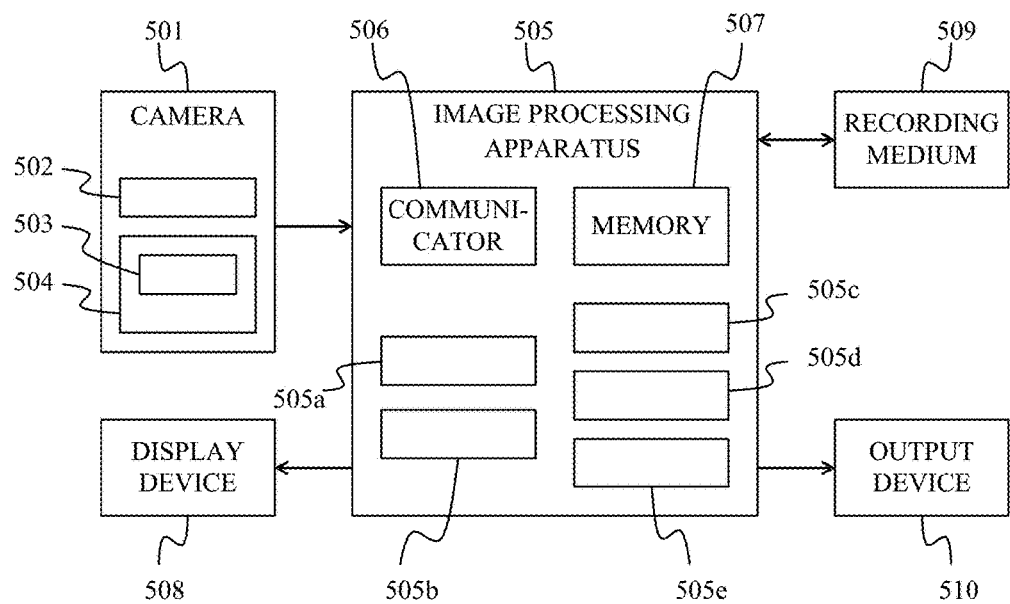
FIG. 13A is a block diagram illustrating a configuration of an image processing system of Embodiment 2 of the present invention.
Figure 13B:
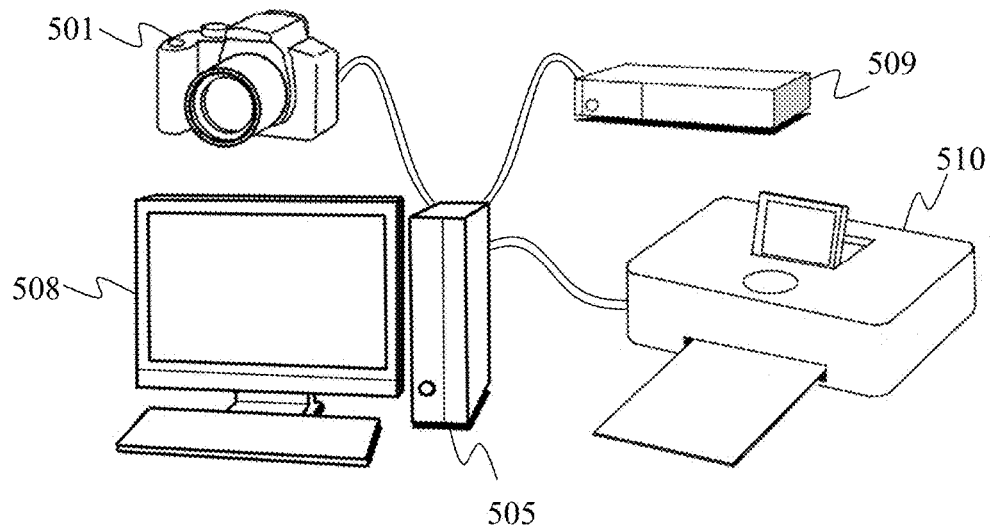
FIG. 13B is an external view of the image processing system of Embodiment 2.

FIG. 13A illustrates a configuration of an image processing system of this embodiment, and FIG. 13B illustrates an external view of the image processing system. The image capturing apparatus 501 includes an imaging optical system 502 imaging light from an object space and an image sensor 504 whose multiple pixels are provided with transmittance distribution providers 503.

The image sensor 504 provides mutually different transmittance distributions to multiple partial pupils of the imaging optical system 502. A detailed configuration of the image capturing apparatus 501 will be described later.

The input image acquired by the image capturing apparatus 501 is input to the image processing apparatus 505 via a communicator 506. The captured image is image data acquired by the image capturing of an overlap image in which multiple observation images corresponding to the multiple partial pupils overlap one another, by using the image sensor 504. The input image is stored to a memory 507 in the image processing apparatus 505. The memory 507 also stores information on the transmittance distributions of the image sensor 504.

The image processing apparatus 505 includes an information acquirer 505a, a parameter setter 505b, an estimated image provider 505c, an estimation completion determiner 505d and an output image producer 505e. The information acquirer 505a corresponds to an acquirer. The parameter setter 505b, the estimated image provider 505c, the estimation completion determiner 505d and the output image provider 505e correspond to a producer. The image processing apparatus 505 produces output images by performing an image process on the input image. The image processing apparatus 505 produces the output images by using the information on the transmittance distributions stored in the memory 507.

The produced output images are output, via the communicator 506, to at least one of a display device 508, a recording medium 509 and an output device 510. The display device 508 is constituted by a liquid crystal display, a projector or the like and displays the output images. A user can work while checking images during the image process displayed on the display device 508. The recording medium 509 is constituted by a semiconductor memory, a hard disk, a server on a network or the like and saves the output images. The output device 510 is constituted by a printer printing the output images, or the like. The image processing apparatus 505 may have a function of performing various image processes as needed.

Next, description will be made of a configuration of the image capturing apparatus 501 with referring to FIG. 14.

Figure 14:
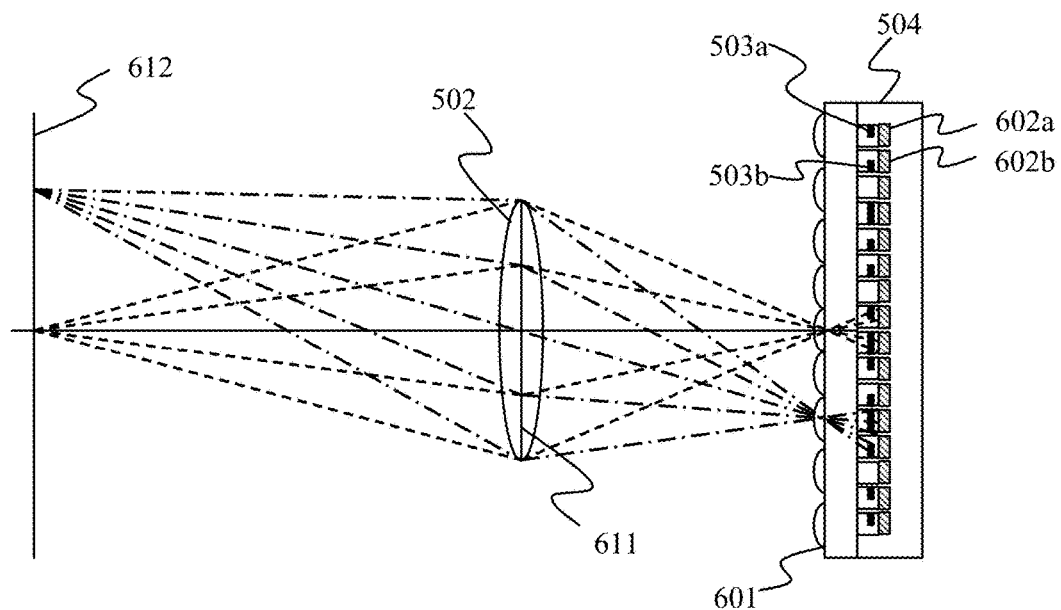
FIG. 14 illustrates a configuration of an image acquirer in Embodiment 2.

The configuration illustrated in FIG. 14 is different from that described in Embodiment 1 using FIG. 1 in that each pixel (each minute lens in a minute lens array 601) includes multiple photoelectric convertors.

The image sensor 504 includes the minute lens array 601, the photoelectric convertors 602 (602a, 602b, . . . ) provided to each pixel and a transmittance distribution provider 503 (503a, 503b, . . . ) provided to each photoelectric convertor 503. The minute lens array 601 and an object plane 612 are provided with a conjugate relation by the imaging optical system 502. Furthermore, a collective pupil 611 of the imaging optical system 502 and each photoelectric convertor 602 are provided with an approximately conjugate relation by the minute lens array 601.

Figure 15:
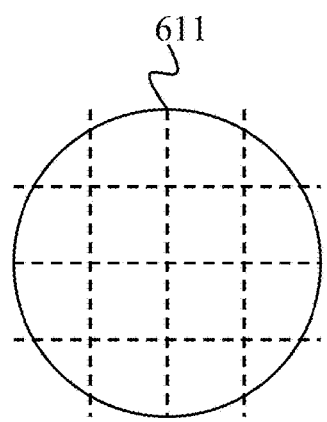
FIG. 15 illustrates partial pupils and a collective pupil in Embodiment 2.
Figure 16:
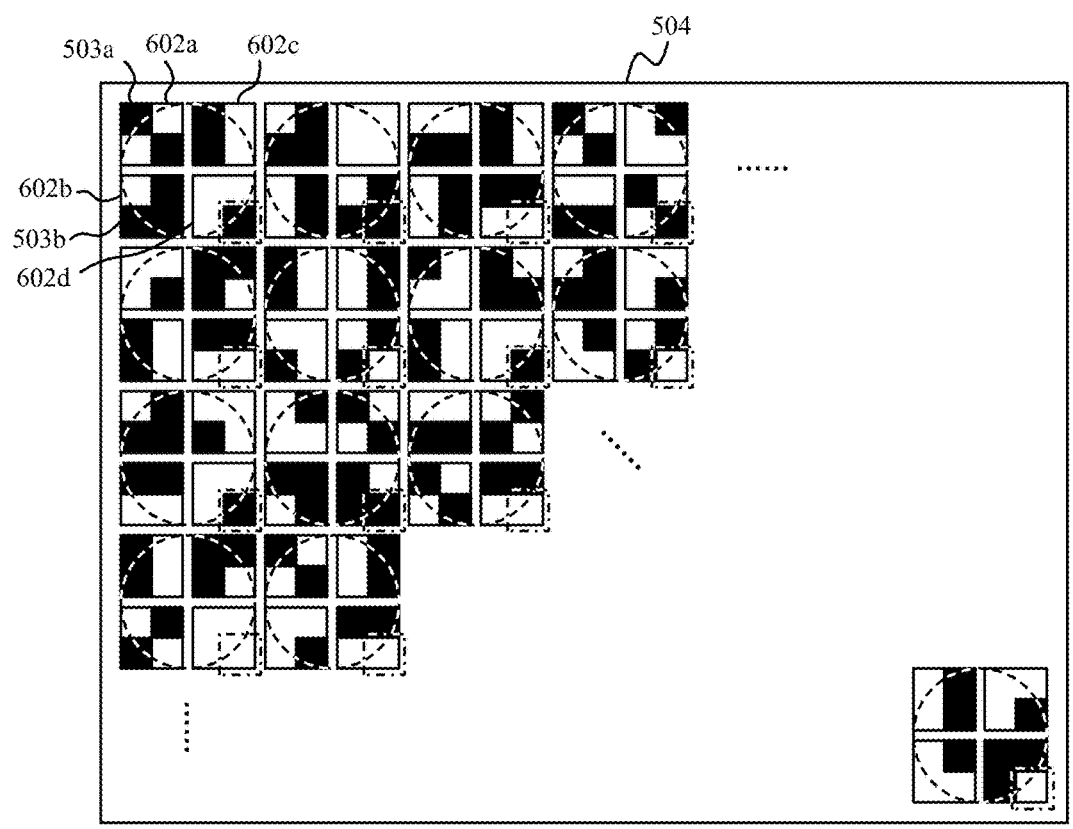
FIG. 16 illustrates transmittance distribution providers in Embodiment 2.

The collective pupil 611 is divided into 16 partial pupils as illustrated in FIG. 15. FIG. 16 illustrates a relation between the partial pupils and the image sensors 504. The image capturing apparatus 501 of this embodiment acquires an optical image of the collective pupil 611 formed by one minute lens of the minute lens array 601 by dividing the optical image by 2×2 photoelectric convertors 602 (four photoelectric convertors in total).

A dashed circle illustrated in FIG. 16 expresses the optial image of the collective pupil 611 formed by one minute lens. The four photoelectric convertors 602 (602a to 602d) receiving this optical image constitute one pixel.

The image sensor 504 illustrated in FIG. 16, as well as the image sensor 104 in Embodiment 1, each of multiple adjacent pixel groups includes pixels having mutually different four or more kinds of transmittance distributions. Furthermore, when focusing on mutually adjacent four pixels in the image sensor 504, the four pixels have mutually different transmittance distributions.

The transmittance distribution provided to the observation image corresponding to each partial pupil can be considered as being similar to that in Embodiment 1. For example, a transmittance distribution provided to the an observation image corresponding to an upper left partial pupil in the collective 611 illustrated in FIG. 15 is obtained by arranging transmittances in portions surrounded by dashed-dotted lines in FIG. 16.

This embodiment acquires, as described above, the optical image of the collective pupil 611 by dividing the optical image by the four photoelectric convertors 602. Thus, the descriptions using expressions (1) to (31) are applicable to a photoelectric convertor group (including multiple photoelectric convertors alternately extracted in horizontal and vertical directions) capturing an observation image corresponding to an identical partial pupil. In this embodiment, a number K of the overlapped observation images is 4, and four partial images corresponding to four pupil areas divided by two dashed lines passing through a center of the collective pupil 611 in FIG. 15 are specified by k=1 to 4.

Figure 8:
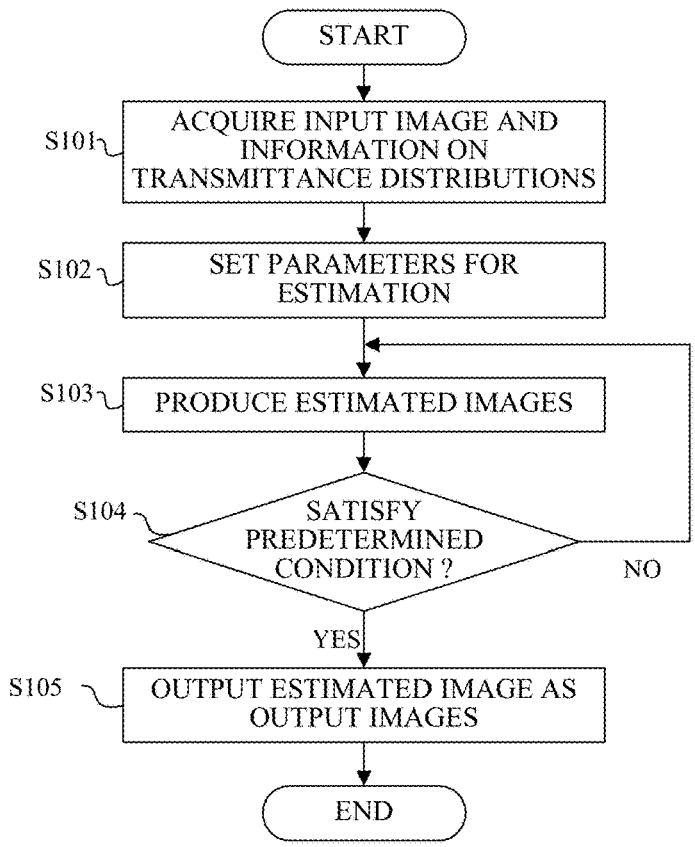
FIG. 8 is a flowchart showing an image process in Embodiment 1 (to 3).

Processes performed by the information acquirer 505*a*, the parameter setter 505*b*, the estimated image provider 505*c*, the estimation completion determiner 505*d* and the output image producer 505*e* are the same as those described using the flowchart of FIG. 8 in Embodiment 1. This embodiment produces 16 viewpoint images corresponding to the partial pupil illustrated in FIG. 15 as the output images.

The image processing apparatus 505 of this embodiment enables, with a small number of the pixels of the image sensor 504, producing multiple high resolution images corresponding to optical images observable when the object space is simultaneously observed from mutually different pupils.

[Embodiment 3]

Next, description will be made of a third embodiment (Embodiment 3) of the present invention. An image capturing apparatus of this embodiment simultaneously performs image capturing of an overlap image in which multiple observation images corresponding to multiple partial pupils overlap one another and image capturing of a normal object image.

Figure 17A:
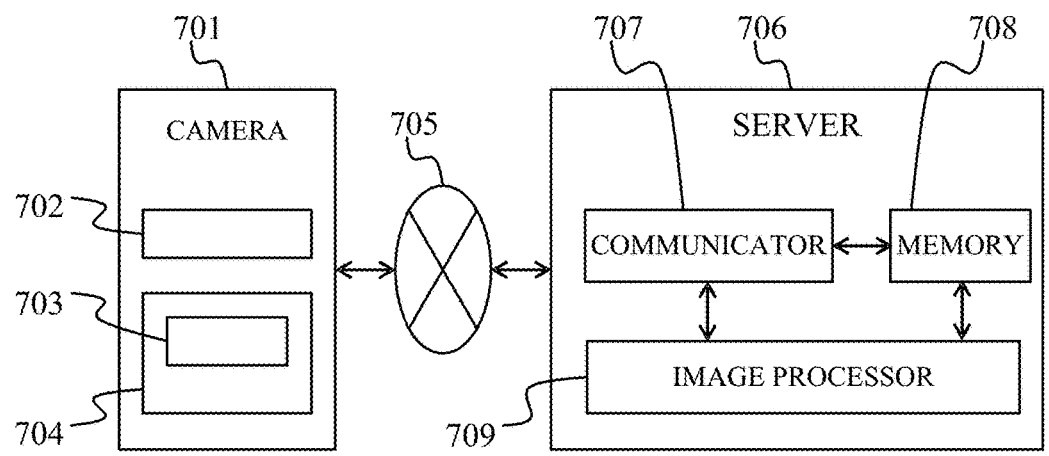
FIG. 17A is a block diagram illustrating a configuration of an image processing system of Embodiment 3 of the present invention.
Figure 17B:
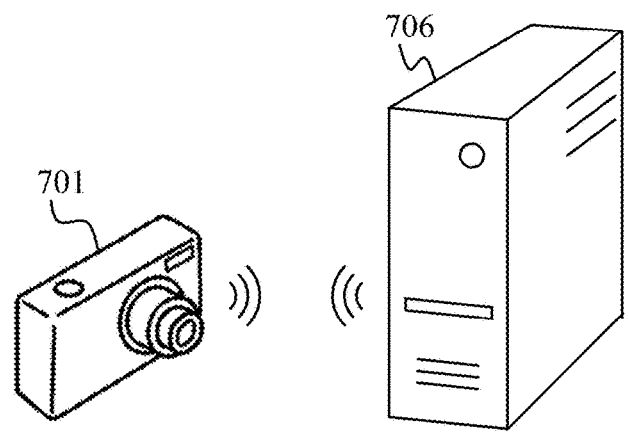
FIG. 17B is an external view of the image processing system of Embodiment 3.

FIG. 17A illustrates a configuration of an image processing system of this embodiment, and FIG. 17B illustrates an external view of the image processing system.

In FIG. 17A, a server 706 includes a communicator 707 and is connected to the image capturing apparatus 701 via a network 705. The server 706 and the image capturing apparatus 701 may be connected to each other by wired or wireless communication.

The image capturing apparatus 701 includes an imaging optical system 702 imaging light from an object space and an image sensor 704 whose multiple pixels are provided with transmittance distribution providers 703. A detailed configuration of the image capturing apparatus 701 will be described later.

A captured image acquired by the image capturing apparatus 701 is automatically or manually sent to the communicator 707 in the server 706 as an image processing apparatus and then is sent to a memory 708 and an image processor 709 in the server 706 as an input image. The input image is stored to the memory 708. The memory 708 also stores information on transmittance distributions provided by the transmittance distribution providers 703. The image processor 709 produces output images by using the input image and the information on the transmittance distributions. The output images are stored in the memory 708 or are sent to the image capturing apparatus 701 via the communicator 707.

Next, description will be made of a configuration of the image capturing apparatus 701 with referring to FIG. 18. FIG. 19 illustrates a relation between pixels in the image sensor 704 and a collective pupil 811.

As illustrated in FIG. 19, the image sensor 704 has a configuration in which pixels each provided with the transmittance distribution provider 703 (703*a*, 703*c* . . . ) and pixels each having no transmittance distribution provider (that is, pixels each whose transmittance distribution is uniform) are alternately arranged.

This configuration enables simultaneously acquiring a captured image of the multiple observation images corresponding to the multiple partial pupils divided in the collective pupil 811 of the imaging optical system 702 and a captured image (normal captured image) of the normal object image.

The image sensor 704 illustrated in FIG. 19, as well as the image sensor 104 in Embodiment 1, each of multiple adjacent pixel groups includes pixels having mutually different four or more kinds of transmittance distributions.

Figure 18:
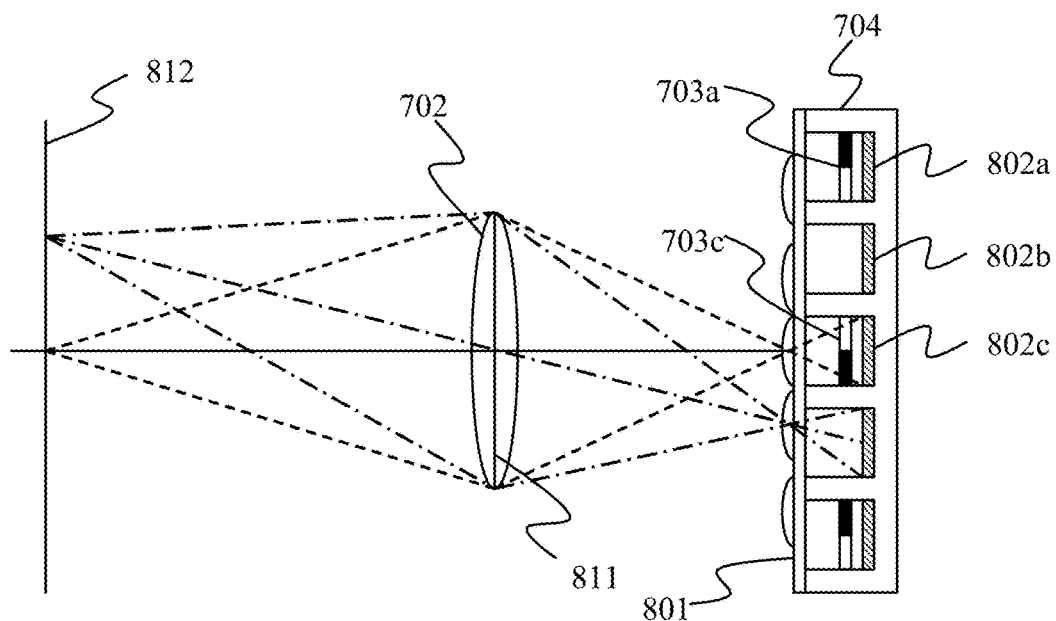
FIG. 18 illustrates a configuration of an image acquirer in Embodiment 3.
Figure 19:
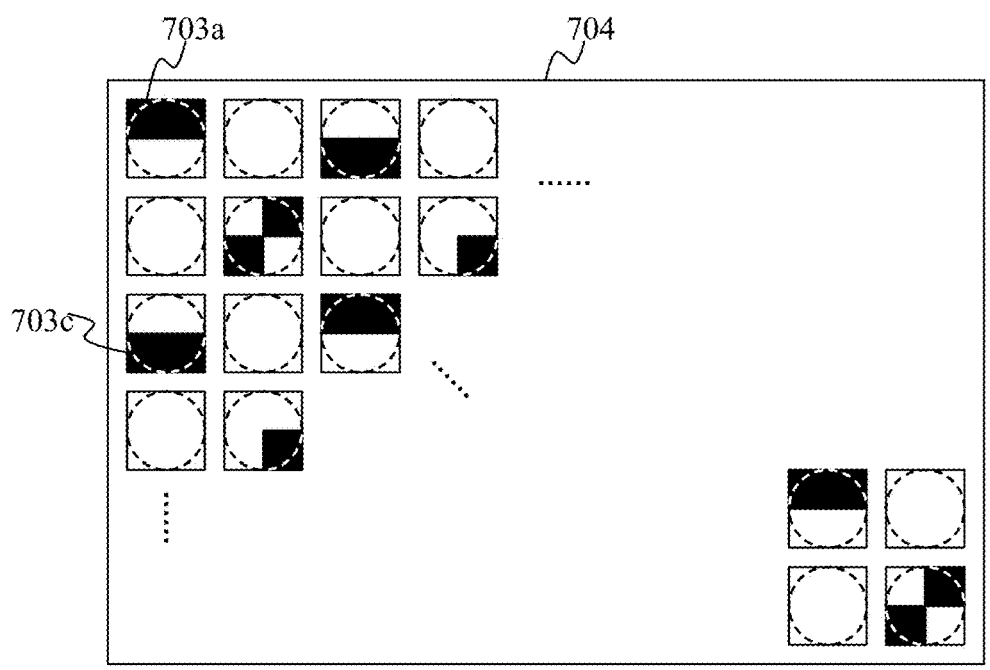
FIG. 19 illustrates transmittance distribution providers in Embodiment 3.

In the configuration illustrated in FIG. 18, the normal captured image is an image acquirable when no transmittance distribution provider 703 is present. However, the configuration illustrated in FIG. 18 provides the normal captured image with half of a resolution provided in a case where any transmittance distribution provider 703 is not present at all.

In addition, in the configuration illustrated in FIGS. 18 and 19, the collective pupil 811 is divided into 2×2 areas (four areas in total).

Other configurations of this embodiment are the same as those illustrated in FIG. 1 in Embodiment 1. Processes performed by the image processor 709 are the same as those described using the flowchart of FIG. 8 in Embodiment 1. However, in this embodiment, the captured image produced by using only outputs form the pixels provided with the transmittance distribution providers 703 in the image sensor 704 is used as the input image. The normal captured image produced by using only outputs from the pixels having no transmittance distribution provider 703 is used as reference data for estimating the output images.

Although the normal captured image and the output image are mutually different in viewpoint or depth of field, broad configurations of the captured object spaces are common to each other.

For this reason, performing the estimation process expressed by expression (9) in Embodiment 1 by using the normal captured image enables improving the estimation accuracy of the output image.

The image processing apparatus (server) 706 of this embodiment enables, with a small number of the pixels of the image sensor 704, producing multiple high resolution images corresponding to optical images observable when the object space is simultaneously observed from mutually different pupils.

This example can also generate a plurality of images in which the number of pixels of the image sensor observed the object space of the same time from a different pupil at least to high resolving with image projection apparatus (server).

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-038668, filed on Feb. 27, 2015, which is hereby incorporated by reference wherein in its entirety.

What is claimed is:

1. An image capturing apparatus comprising:
an image sensor configured to capture an optical image formed by light entering an imaging optical system from an object space,
the image sensor including (a) multiple pixels each including at least one photoelectric convertor and (b) a transmittance distribution provider configured to provide, to at least part of the multiple pixels, a transmittance distribution depending on an incident angle of the light,
the multiple pixels including an adjacent pixel group that includes a first pixel and second pixels adjacent to the first pixel, the adjacent pixel group including pixels to which mutually different four or more kinds of the transmittance distributions are provided; and
an image processor configured to produce, by using (a) an input image produced from an output of the image sensor and (b) information on the transmittance distributions, an output image corresponding to an optical observation image observable when the object space is observed from a first partial area of a pupil of the imaging optical system,
wherein the input image contains pixels each of which contains light intensity information of a plurality of observation images observable through mutually different partial areas of the pupil of the imaging optical system, and
wherein the image processor produces the output image by separating light intensity information of the observation image observable through the first partial area of the pupil of the imaging optical system from a pixel of the input image.

2. The image capturing apparatus according to claim 1, wherein the transmittance distributions provided to all the first and second pixels included in the adjacent pixel group are mutually different.

3. The image capturing apparatus according to claim 1, wherein, when the first pixel of the adjacent pixel group including the pixels to which the four or more kinds of the transmittance distributions are provided is referred to as a specific pixel, one-half or more of the multiple pixels are the specific pixels.

4. The image capturing apparatus according to claim 3, wherein all the multiple pixels are the specific pixels.

5. The image capturing apparatus according to claim 1, wherein the following condition is satisfied where $t_{kave,xyave}$ represents a value obtained by averaging an average value of the transmittance distributions in each pixel over all the multiple pixels:

$$0.1 \leq t_{kave,xyave} \leq 0.9$$

6. The image capturing apparatus according to claim 1, wherein the following condition is satisfied where $t_{max}$ and $t_{min}$ respectively represent a maximum value and a minimum value of the transmittance distribution of each of at least one of the multiple pixels:

$$0.0 \leq \frac{t_{min}}{t_{max}} \leq 0.6.$$

7. The image capturing apparatus according to claim 6, wherein one-half or more of the multiple pixels satisfy the condition relating $t_{max}$ and $t_{min}$.

8. The image capturing apparatus according to claim 1, wherein the following condition is satisfied where $t_{kave,max}$ and $t_{kave,min}$ respectively represent a maximum value and a minimum value of an angular average transmittance, the angular average transmittance being an average value of the transmittance distributions of each pixel:

$$0.2 \leq \frac{t_{kave,min}}{t_{kave,max}} \leq 1.$$

9. The image capturing apparatus according to claim 1, wherein the transmittance distribution provider is constituted by using a light blocker blocking entrance of the light into part of the pixel.

10. The image capturing apparatus according to claim 1, wherein the transmittance distribution provider is constituted by using a diffractive element.

11. The image capturing apparatus according to claim 1, wherein mutually adjacent four pixels among the multiple pixels have the transmittance distributions mutually different.

12. The image capturing apparatus according to claim 1, further comprising a memory storing the input image and the information on the transmittance distributions of the multiple pixels.

13. An image processing apparatus comprising:
an image acquirer configured to acquire an input image produced by using an output from an image sensor configured to capture an optical image formed by light entering an imaging optical system from an object space,
the image sensor including (a) multiple pixels each including at least one photoelectric convertor and (b) a transmittance distribution provider configured to provide, to at least part of the multiple pixels, a transmittance distribution depending on an incident angle of the light,
the multiple pixels including an adjacent pixel group that includes a first pixel and second pixels adjacent to the first pixel, the adjacent pixel group including pixels to which mutually different four or more kinds of the transmittance distributions are provided; and
a producer configured to:
acquire information on the transmittance distributions of the multiple pixels, and produce, by using (a) an input image produced from an output of the image sensor and (b) information on the transmittance distributions, an output image corresponding to an optical observation image observable when the object space is observed from a first partial area of a pupil of the imaging optical system, wherein the input image contains pixels each of which contains light intensity information of a plurality of observation images observable through mutually different partial areas of the pupil of the imaging optical system, and wherein the producer produces the output image by separating light intensity information of the observation image observable through the first partial area of the pupil of the imaging optical system from a pixel of the input image.

14. The image capturing apparatus according to claim 1, wherein the number of pixels of the image sensor is smaller than a product of the number of pixels of the output image and the number of the partial areas of the pupil of the imaging optical system.

15. The image processing apparatus according to claim 13, wherein the number of pixels of the image sensor is smaller than a product of the number of pixels of the output image and the number of the partial areas of the pupil of the imaging optical system.

* * * * *